(12) United States Patent
Uchino et al.

(10) Patent No.: US 10,757,605 B2
(45) Date of Patent: Aug. 25, 2020

(54) RADIO COMMUNICATION DEVICE AND RADIO COMMUNICATION METHOD

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/934,513

(22) Filed: Mar. 23, 2018

(65) Prior Publication Data

US 2018/0213439 A1    Jul. 26, 2018

Related U.S. Application Data

(63) Continuation of application No. PCT/JP2016/073130, filed on Aug. 5, 2016.

(30) Foreign Application Priority Data

Sep. 24, 2015  (JP) .................................. 2015-187314
Nov. 5, 2015   (JP) .................................. 2015-217751

(51) Int. Cl.
*H04W 28/06* (2009.01)
*H04W 36/02* (2009.01)
(Continued)

(52) U.S. Cl.
CPC ......... *H04W 28/065* (2013.01); *H04L 1/0004* (2013.01); *H04L 1/0007* (2013.01);
(Continued)

(58) Field of Classification Search
CPC ... H04W 28/04; H04W 28/06; H04W 28/065; H04W 28/0278; H04W 36/02;
(Continued)

(56) References Cited

U.S. PATENT DOCUMENTS 8,270,348 B2    9/2012  Chun et al.
9,014,010 B2 *  4/2015  Yi ........................ H04W 24/10
                                                    370/242
(Continued)

FOREIGN PATENT DOCUMENTS

EP    2086148 A2    8/2009
JP    2010-519880 A 6/2010
(Continued)

OTHER PUBLICATIONS

Written Opinion dated Oct. 25, 2016, for PCT/JP2016/073130 (3 pages).
(Continued)

*Primary Examiner* — Redentor Pasia
(74) *Attorney, Agent, or Firm* — Osha Liang LLP

(57) ABSTRACT

A radio communication device is disclosed that transmits and receives protocol data units in a packet data convergence protocol layer located above a radio link control layer. The radio communication device includes a processor that generates a status report indicating reception status of the protocol data units in the packet data convergence protocol layer and a transmitter that transmits the status report in the packet data convergence protocol layer to a destination radio communication device. If a size of a protocol data unit that includes the status report exceeds a predetermined threshold, the processor sets the size of the protocol data unit to the predetermined threshold and the transmitter transmits the protocol data unit having the set size to the destination radio communication device.

6 Claims, 11 Drawing Sheets

(51) Int. Cl.
*H04W 28/04* (2009.01)
*H04W 80/02* (2009.01)
*H04L 1/16* (2006.01)
*H04L 1/00* (2006.01)
*H04W 28/02* (2009.01)
*H04L 1/18* (2006.01)
*H04W 24/10* (2009.01)

(52) U.S. Cl.
CPC ............ *H04L 1/165* (2013.01); *H04L 1/1628* (2013.01); *H04W 28/0278* (2013.01); *H04W 28/04* (2013.01); *H04W 28/06* (2013.01); *H04W 36/02* (2013.01); *H04W 80/02* (2013.01); *H04L 1/1864* (2013.01); *H04W 24/10* (2013.01)

(58) Field of Classification Search
CPC .... H04W 80/02; H04L 1/1628; H04L 1/0004; H04L 1/0007; H04L 1/165
See application file for complete search history.

(56) References Cited

U.S. PATENT DOCUMENTS

| | | | | |
|---|---|---|---|---|
| 10,075,881 | B2* | 9/2018 | Yi | H04W 36/0061 |
| 2009/0196191 | A1* | 8/2009 | Fischer | H04L 1/0031 |
| | | | | 370/252 |
| 2009/0207739 | A1* | 8/2009 | Chun | H04L 1/1614 |
| | | | | 370/241 |
| 2010/0105334 | A1* | 4/2010 | Terry | H04L 1/1607 |
| | | | | 455/67.11 |
| 2011/0205906 | A1 | 8/2011 | Yi et al. | |
| 2012/0040621 | A1* | 2/2012 | Jung | H04W 24/10 |
| | | | | 455/67.11 |
| 2015/0146617 | A1* | 5/2015 | Park | H04W 24/10 |
| | | | | 370/328 |
| 2015/0256653 | A1* | 9/2015 | Ambriss | H04L 69/04 |
| | | | | 370/235 |
| 2016/0014647 | A1* | 1/2016 | Yi | H04W 36/0072 |
| | | | | 370/331 |
| 2017/0064768 | A1* | 3/2017 | Lee | H04L 43/10 |
| 2017/0215225 | A1* | 7/2017 | Yi | H04W 80/02 |
| 2017/0223578 | A1* | 8/2017 | Hong | H04L 41/0803 |
| 2017/0374579 | A1* | 12/2017 | Wang | H04W 28/08 |
| 2018/0092118 | A1* | 3/2018 | Kim | H04W 28/0278 |
| 2018/0198566 | A1* | 7/2018 | Yi | H04W 28/02 |
| 2019/0007291 | A1* | 1/2019 | Yi | H04W 12/0013 |

FOREIGN PATENT DOCUMENTS

| | | |
|---|---|---|
| KR | 101467798 B1 | 12/2014 |
| WO | 2014025141 A1 | 2/2014 |

OTHER PUBLICATIONS

Samsung, "L2 enhancements for eCA", 3GPP TSG-RAN WG2 Meeting #91, R2-153171, Beijing, China, Aug. 24-28, 2015 (3 pages).
Nokia Networks, "PDCP Status PDU with PDCP SN extension", 3GPP TSG-RAN WG2 Meeting #91bis, R2-154593, Malmö, Sweden, Oct. 5-9, 2015 (3 pages).
Session Chairman (LG Electronics), "Report of the LTE UP session", 3GPP TSG RAN WG2 #91bis, R2-154890, Malmö, Sweden, Oct. 5-9, 2015 (11 pages).
Nokia Networks (Rapporteur), "Report of email discussion [91bis#25][LTE/CAenh]", 3GPP TSG-RAN WG2 Meeting #92, R2-156672, Anaheim, USA, Nov. 16-20, 2015 (8 pages).
ETSI TS 136 323 V12.4.0, Technical Specification "LTE; Evolved Universal Terrestrial Radio Access (E-UTRA); Packet Data Convergence Protocol (PDCP) specification (3GPP TS 36.323 version 12.4.0 Release 12)" (35 pages).
International Search Report issued in the corresponding International Application No. PCT/JP2016/073130, dated Oct. 25, 2016 (5 pages).
NTT Docomo, Inc.; "Handling of huge Pdcp control PDU"; 3GPP TSG-RAN WG2 #91 bis, R2-154406; Malmö, Sweden, Oct. 5-9, 2015 (3 pages).
Extended European Search Report issued in the counterpart European Patent Application No. 16848411.1, dated Aug. 6, 2018 (11 pages).
Korean Office Action issued in the counterpart Korean Patent Application No. 10-2018-7008175, dated Nov. 8, 2019 (8 pages).

* cited by examiner

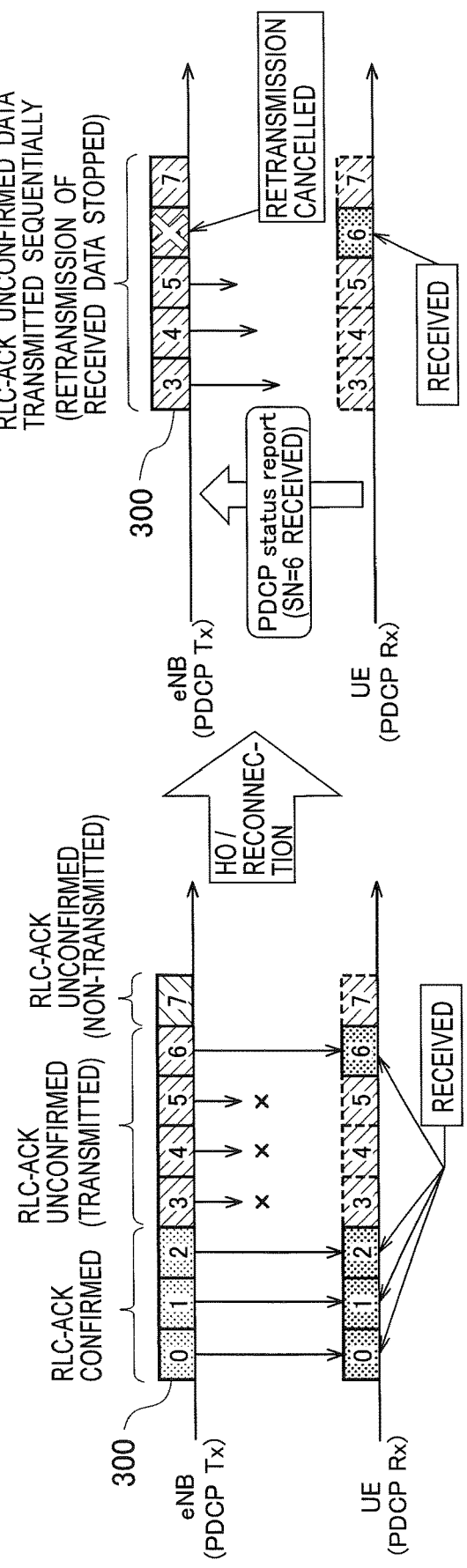
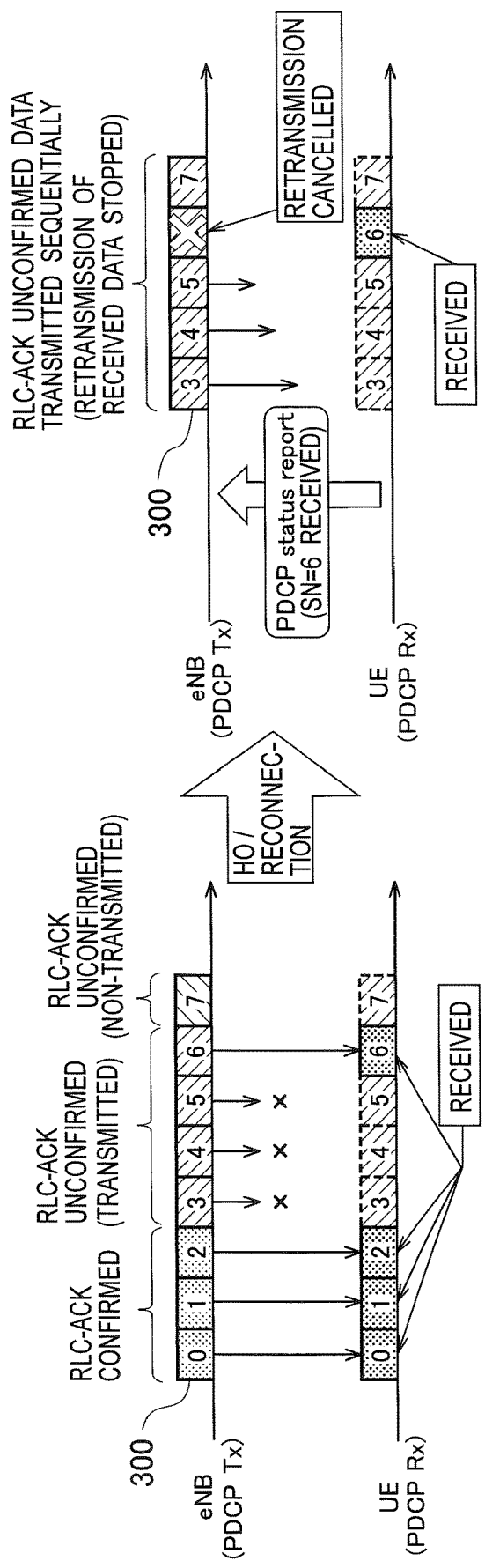
FIG. 2B
FIG. 2A

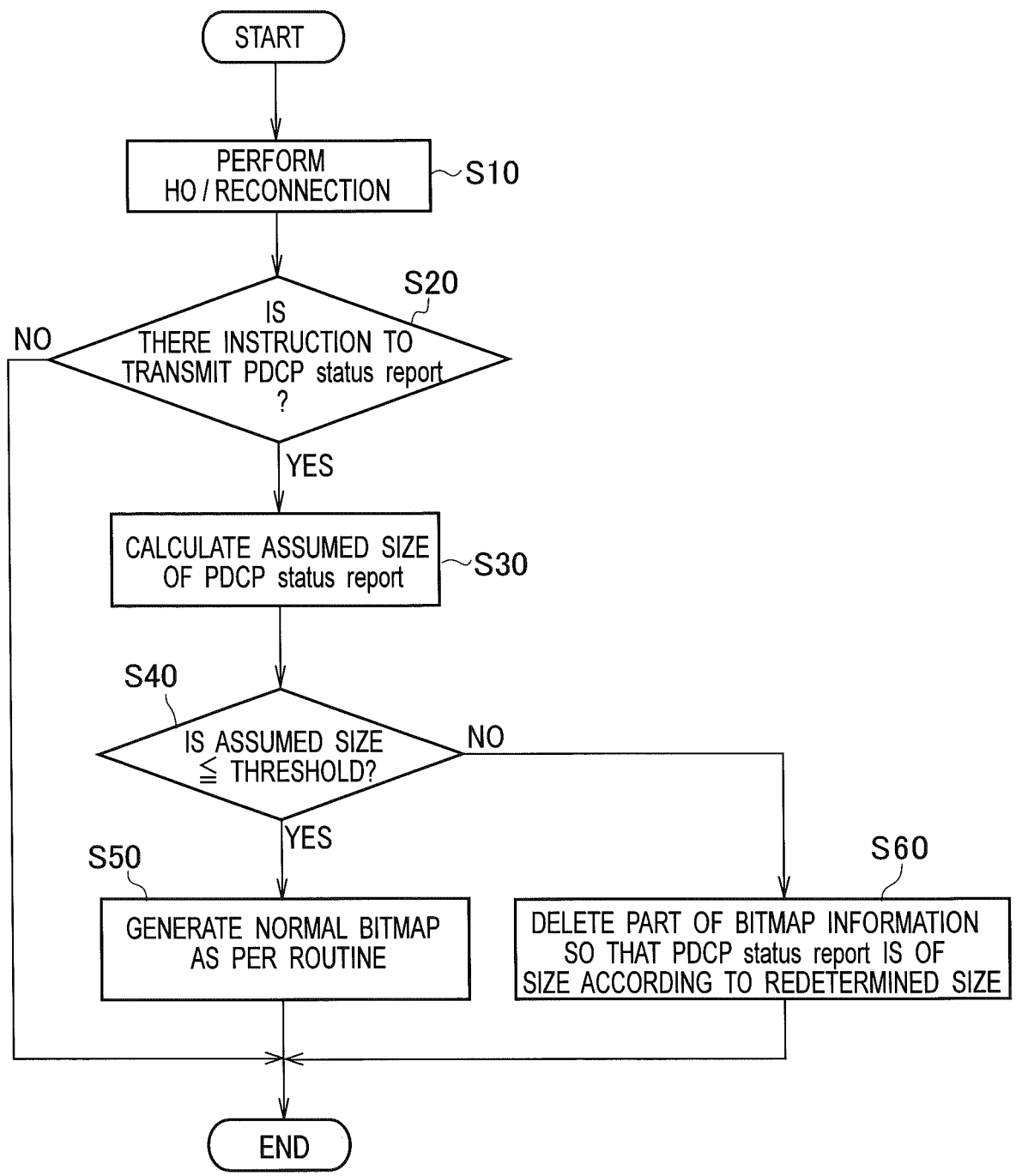

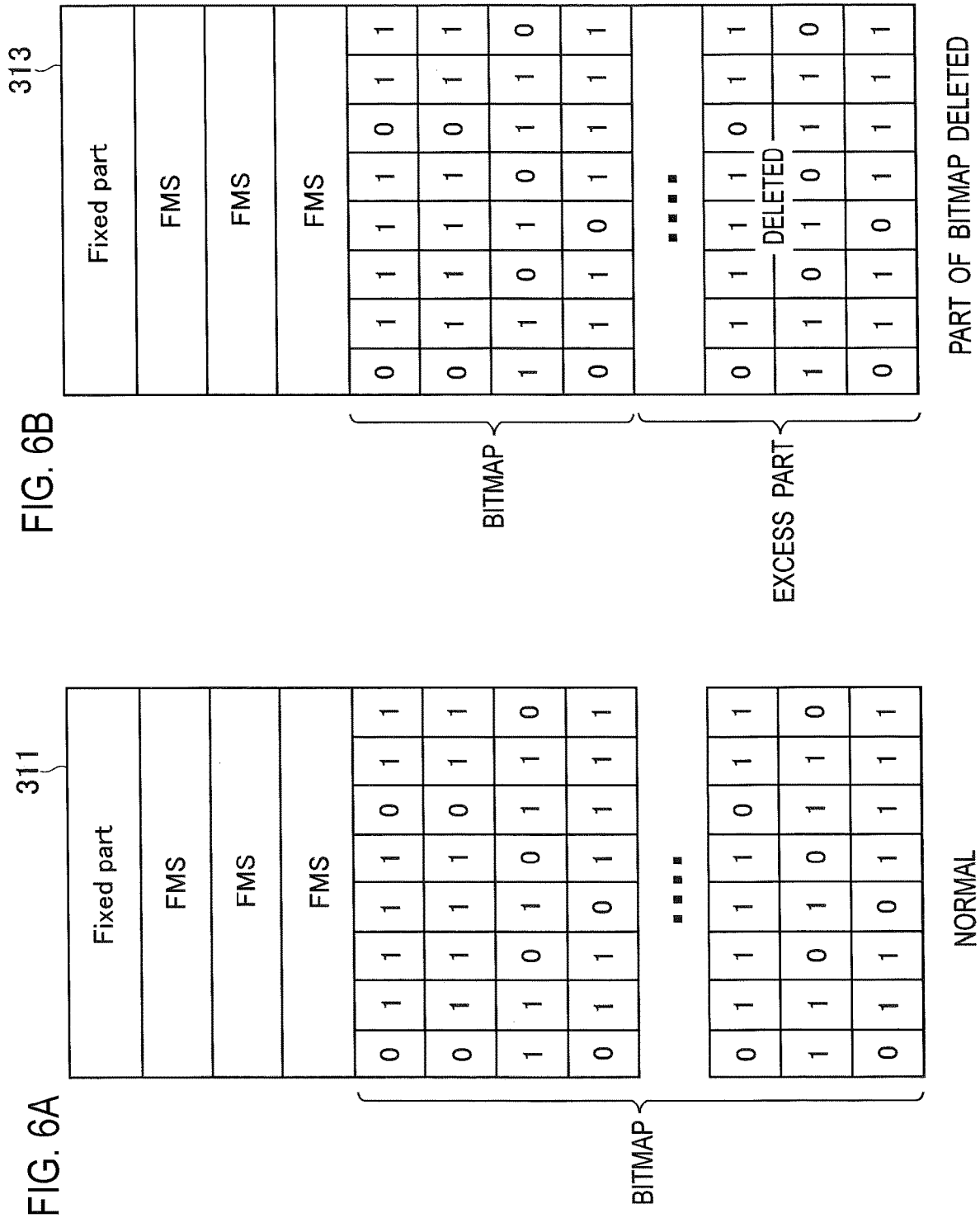

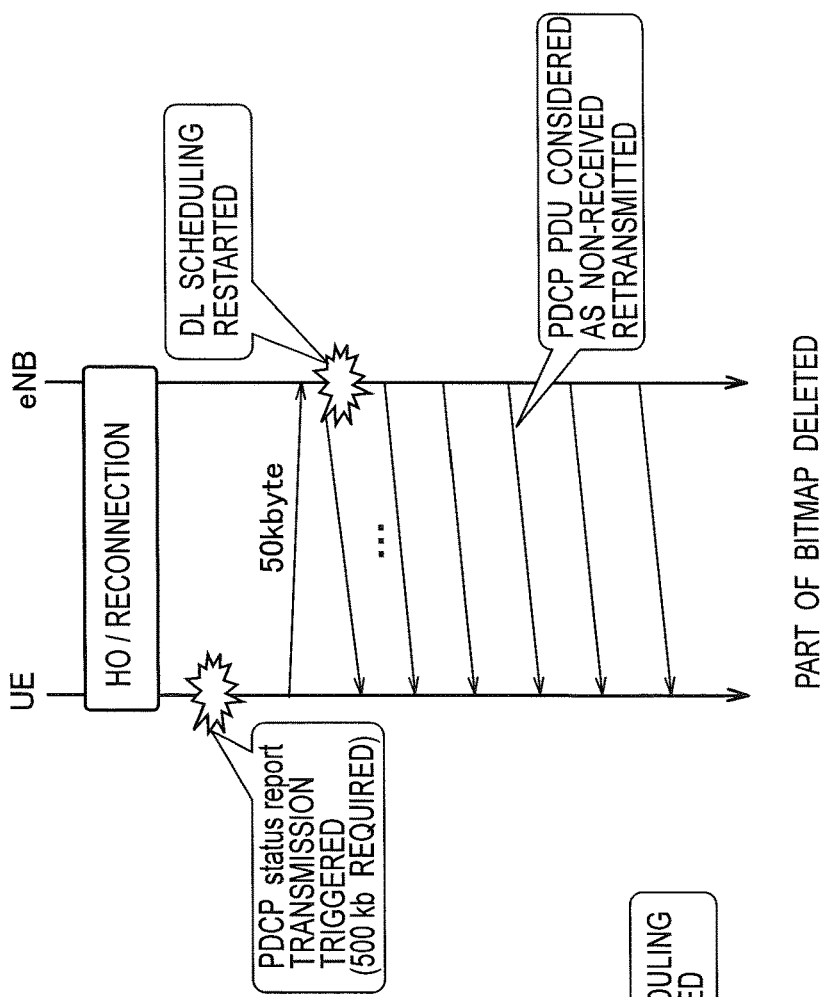
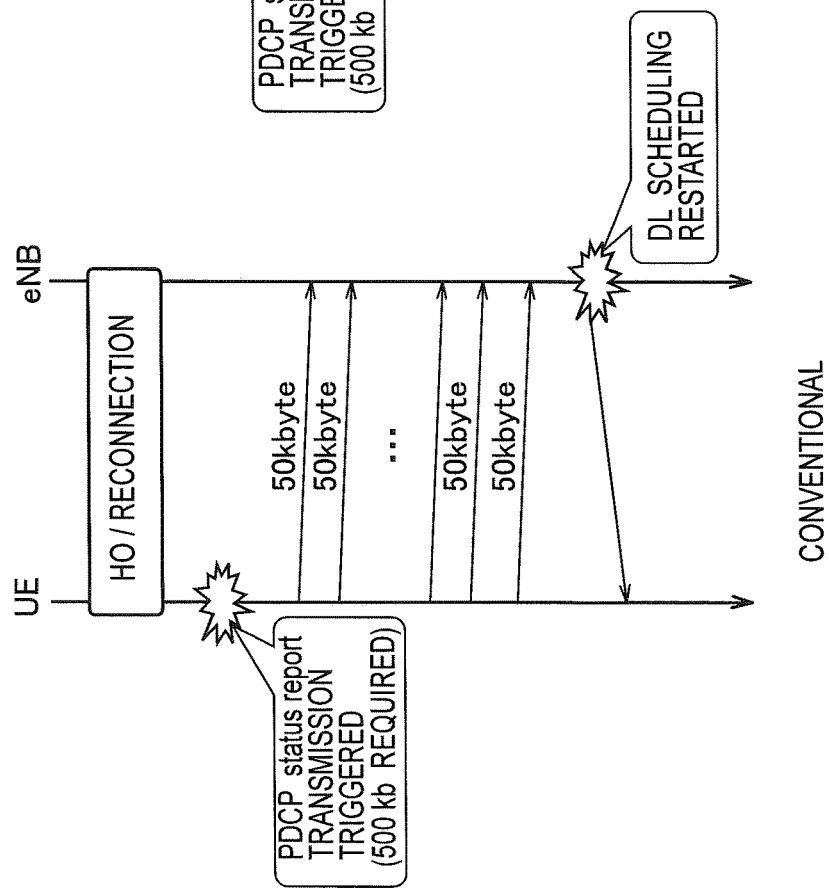

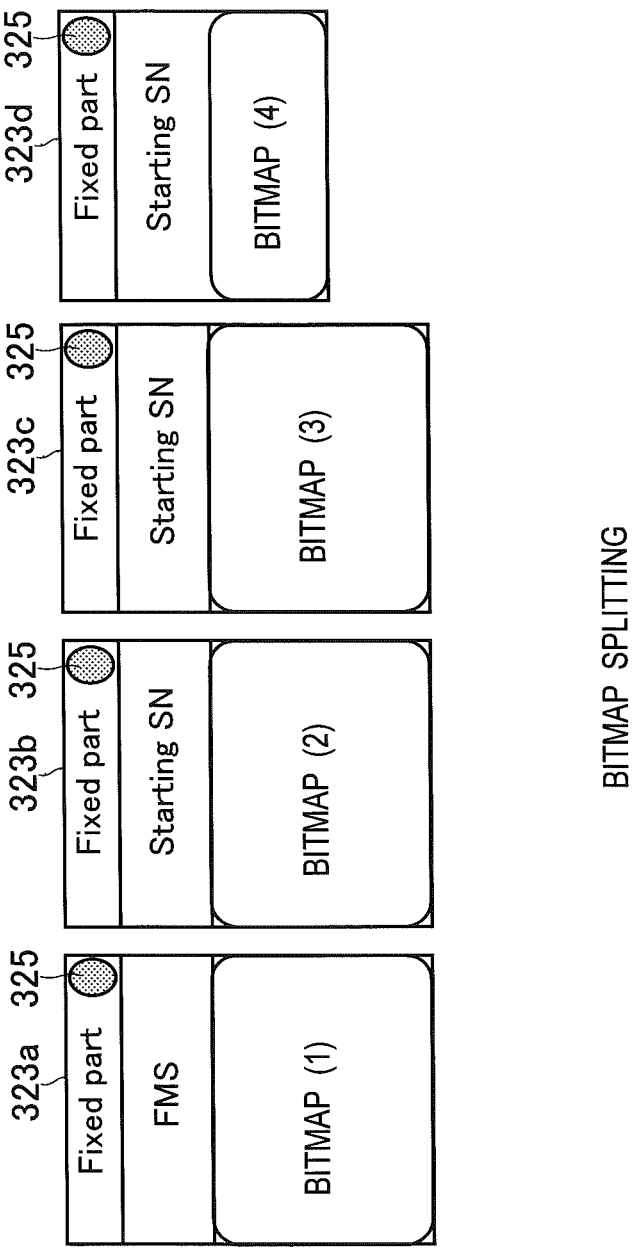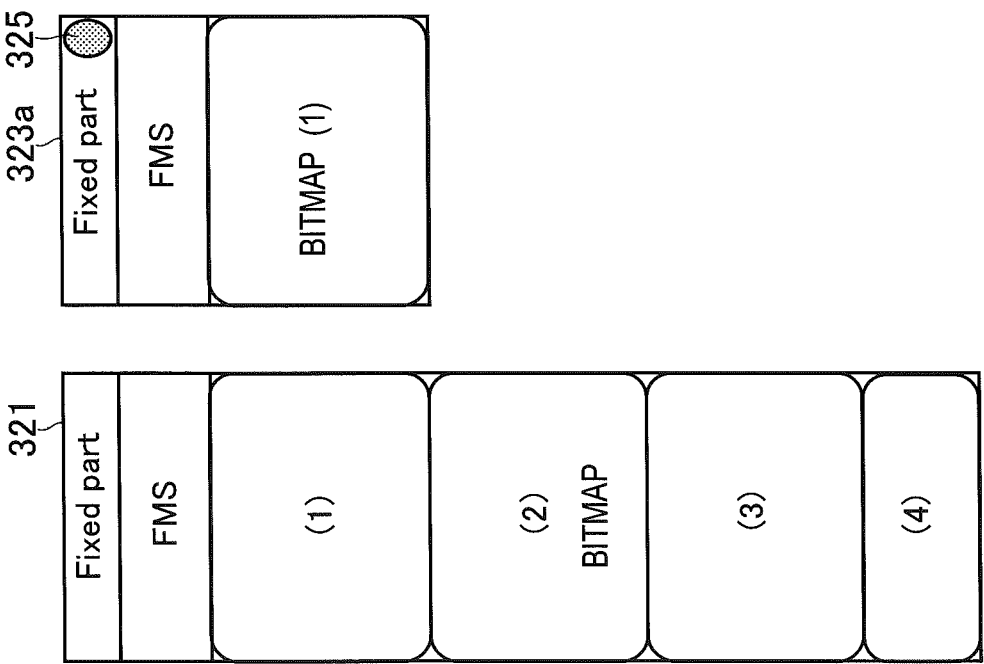

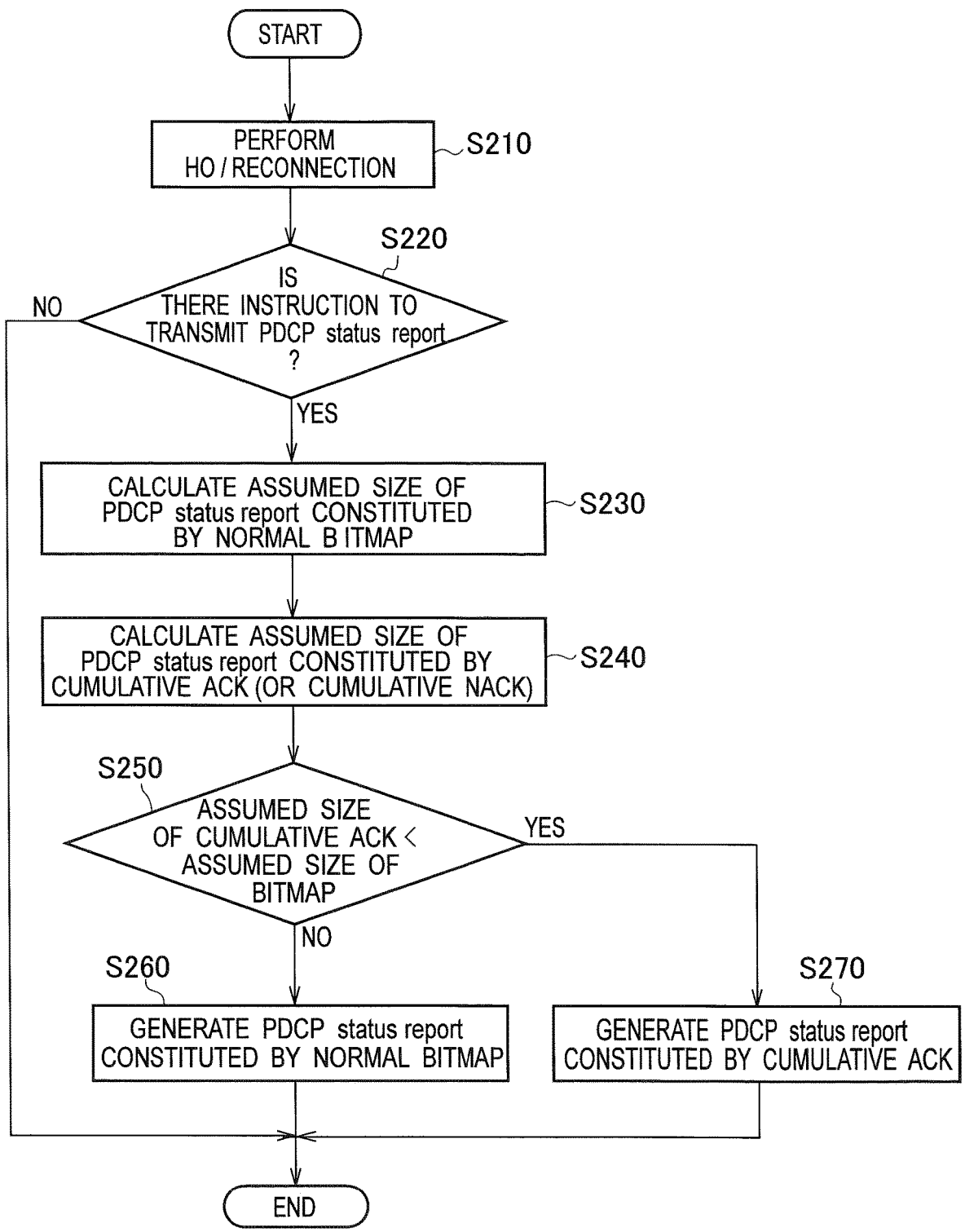

FIG. 12A

FIG. 12B

RADIO COMMUNICATION DEVICE AND RADIO COMMUNICATION METHOD

CROSS REFERENCE TO RELATED APPLICATIONS

The present application is a continuation application of PCT/JP2016/073130 filed on Aug. 5, 2016, which claims priority to Japanese Patent Application 2015-187314 (filed on Sep. 24, 2015) and Japanese Patent Application 2015-217751 (filed on Nov. 5, 2015). The contents of these applications are hereby incorporated by reference in their entirety.

FIELD OF THE INVENTION

The present invention relates to a radio communication device and a radio communication method that transmit and receive a protocol data unit in a packet data convergence protocol layer.

BACKGROUND

In the specifications of Long Term Evolution (including LTE and LTE-Advanced) stipulated in the 3rd Generation Partnership Project (3GPP), a packet data convergence protocol (PDCP) layer is stipulated above the radio link control (RLC) layer (refer to Non-Patent Document 1).

When the PDCP is re-established in cases such as handover to another cell or reconnection to the cell (hereinafter, HO/reconnection), a mobile station (UE) transmits to a radio base station (eNB) a PDCP status report. The eNB instructs the UE whether to transmit the PDCP status report or not for each radio bearer.

The object of the PDCP status report is to notify the eNB of reception status of a protocol data unit (PDU) in the PDCP level in the UE and avoid double transmission of the PDU in the PDCP level. In other words, to avoid double transmission of the PDCP PDU after an HO/reconnection.

The PDCP status report includes a First Missing sequence number (FMS) and a bitmap. The FMS indicates a sequence number (SN) of the oldest non-received PDCP PDU. The bitmap indicates reception status of the FMS and PDCP PDUs subsequent to that FMS by using 0 (NG) or 1 (OK).

In Release-13 of the 3GPP, how to extend the limitation of maximum 5 component carriers (CC) used in the carrier aggregation (CA) stipulated in Release-12 LTE up to a maximum of 32 CCs is being studied.

Considering the increase in peak throughput following such extension, extension of the SN length of the PDCP PDU has been agreed upon (refer to Non-Patent Document 2).

PRIOR ART DOCUMENTS

[Non-Patent Document 1]: 3GPP TS 36.323 V 12.4.0 3rd Generation Partnership Project; Technical Specification Group Radio Access Network; Evolved Universal Terrestrial Radio Access (E-UTRA); Packet Data Convergence Protocol (PDCP) specification (Release 12), 3GPP, June 2015

[Non-Patent Document 2]: 3GPP R2-153171, "L2 enhancements for eCA", 3GPP, August 2015, [as searched on Sep. 17, 2015], Internet <URL: http://www.3gpp.org/ftp/Meetings_3GPP_SYNC/RAN2/Docs/>

SUMMARY OF THE INVENTION

In accordance with one or more embodiments of the invention, a radio communication device is described that transmits and receives protocol data units in a packet data convergence protocol layer located above a radio link control layer, the radio communication device comprising: a processor that generates a status report indicating reception status of the protocol data units in the packet data convergence protocol layer; and a transmitter that transmits the status report in the packet data convergence protocol layer to a destination radio communication device, wherein if a size of a protocol data unit that includes the status report exceeds a predetermined threshold, the processor sets the size of the protocol data unit to the predetermined threshold and the transmitter transmits the protocol data unit having the set size to the destination radio communication device.

In some aspects, when the size of the protocol data unit exceeds the predetermined threshold, the processor determines, based on an instruction received from the destination radio communication device, whether to set the size of the protocol data unit to the predetermined threshold or not.

In some aspects, a protocol data unit transmitted by the transmitter comprises an indicator indicating that the size of the protocol data unit has been set according to the predetermined threshold.

In accordance with one or more embodiments of the invention, a radio communication device is described that transmits and receives protocol data units in a packet data convergence protocol layer located above a radio link control layer, the radio communication device comprising: a receiver that receives, in the packet data convergence protocol layer from a destination radio communication device, a status report indicating reception status of the protocol data units in the packet data convergence protocol layer, wherein in the status report an excess part of a protocol data unit having a size exceeding a predetermined threshold is deleted; and a processor that controls retransmission of the protocol data units based on the status report such that a protocol data unit that has already been transmitted to the destination radio communication device but for which reception status is not included in the status report is retransmitted.

In accordance with one or more embodiments of the invention, a radio communication method is described that transmits and receives protocol data units in a packet data convergence protocol layer located above a radio link control layer, the radio communication method comprising: generating a status report that indicates reception status of protocol data units in the packet data convergence protocol layer; and transmitting to a destination radio communication device of the radio communication device in the packet data convergence protocol layer the generated status report, wherein: generating the status report includes setting, if the size of a protocol data unit that includes the status report exceeds a predetermined threshold, the size of the protocol data unit according to the predetermined threshold; and transmitting to the destination radio communication device the protocol data unit that is set to the size according to the predetermined threshold.

In accordance with one or more embodiments of the invention, a radio communication device os described that transmits and receives protocol data units in a packet data convergence protocol layer located above a radio link control layer, the radio communication device comprising: a processor that generates a status report indicating reception status of the protocol data units in the packet data convergence protocol layer; and a transmitter that transmits the status report in the packet data convergence protocol layer to a destination radio communication device, wherein if a size of a protocol data unit that includes the status report exceeds a predetermined threshold, the status report generating section splits the status report and generates status report pieces, and the transmitter transmits to the destination radio communication device the protocol data units that include the status report pieces.

In some aspects, the processor determines whether to generate the status report pieces based on an instruction from the destination radio communication device.

In some aspects, a protocol data unit transmitted by the transmitter includes an indicator that indicates whether any subsequent status report piece exists.

In some aspects, a protocol data unit transmitted by the transmitter includes user plane data in an interval when a plurality of the protocol data units that include the status report pieces is transmitted.

In accordance with one or more embodiments of the invention, a radio communication method is described that transmits and receives protocol data units in a packet data convergence protocol layer located above a radio link control layer, the radio communication method comprising: generating a status report that indicates reception status of the protocol data units in the packet data convergence protocol layer; and transmitting the status report in the packet data convergence protocol layer to a destination radio communication device, wherein generating the status report includes, if the size of the protocol data unit that includes the status report exceeds a predetermined threshold, splitting the status report to generate status report pieces, and transmitting the status report includes transmitting to the destination radio communication device the protocol data units that include the status report pieces.

BRIEF DESCRIPTION OF DRAWINGS

FIGS. 2(a) and 2(b) are diagrams showing examples of retransmission control performed on PDCP PDU in PDCP layer at the time of HO/reconnection.

FIG. 5 is a diagram showing an operation flow of PDCP status report generation by the UE 100 according to a first embodiment of the invention.

FIGS. 6(a) and 6(b) are diagrams showing examples of PDCP PDU that includes PDCP status report constituted by a normal bitmap according to the first embodiment, and PDCP PDU that includes PDCP status report from which a part of the bitmap is deleted.

FIGS. 7(a) and 7(b) are diagrams showing sequences of transmission and reception of the PDCP status report between the UE 100 and the eNB 200 according to the first embodiment.

FIGS. 9(a) and 9(b) are diagrams showing examples of PDCP PDU that includes PDCP status report constituted by a normal bitmap according to the second embodiment, and PDCP PDU that includes PDCP status report in which the bitmap is split.

FIG. 11 is a diagram showing an operation flow of PDCP status report generation by UE 100 according to a third embodiment of the invention.

FIGS. 12(a) and 12(b) are diagrams showing examples of PDCP PDU that includes PDCP status report constituted by a normal bitmap according to the third embodiment, and PDCP PDU that includes PDCP status report constituted by accumulated NACKs.

DETAILED DESCRIPTION

Figure 1:
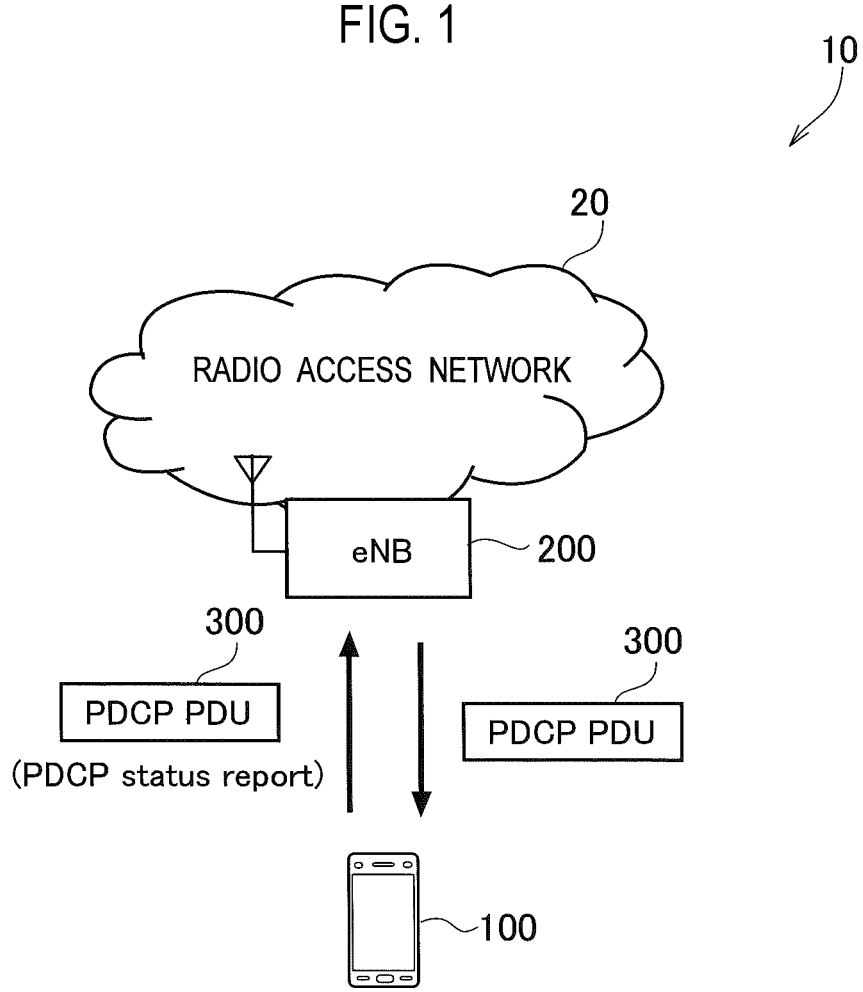
FIG. 1 is an overall structural diagram of a mobile communication system 10.

Even if the downlink peak throughput is to be improved because of the extension of the CA as explained above or due to introduction of 256 QAM, the uplink throughput depends on the UE capacity. Thus, the uplink peak throughput is assumed to be a peak throughput (50 MHz/CC, 16 QAM) equivalent to that of Release-8 LTE.

In such a case, if the SN length of the PDCP PDU is extended, the eNB takes some time to receive the PDCP status report from the UE and, consequently, downlink data transmission at the time of the HO/reconnection may be delayed.

Specifically, because the eNB confirms the contents of the PDCP status report and then transmits the PDCP PDU, transmission of the PDCP PDU to the UE cannot start until all the byte segments that constitute the PDCP status report are received. Moreover, because the PDCP PDU is segmented in the Radio Link Control (RLC) layer, the PDCP PDU can be reconstituted only when all the segments of the PDCP PDU have been received without any loss. Therefore, starting the process when only part of the PDCP PDU has been received is difficult.

Furthermore, in the present PDCP specifications, the maximum value of the PDCP PDU has not been stipulated. However, the maximum value (8188 bytes) of the PDCP Service Data Unit (SDU) is stipulated, and it is highly possible that the UE will be designed assuming the size of the PDCP PDU according to the maximum value of the PDCP SDU.

Accordingly, because the size of the PDCP status report will exceed 500 kilobytes (kb) when the SN length of the PDCP PDU is extended as explained above, it is possible that the UE cannot process a PDCP status report of such size.

Although it is possible to design the UE so as to be able to process the PDCP status report of such size, improving the processing capacity of the UE only for such processing is not desirable when the cost performance of the UE is taken into consideration.

One or more embodiments of the present invention have been made in view of the above circumstances. One or more embodiments of the present invention provide a radio communication device and a radio communication method that can avoid requiring improvement in the processing capacity while preventing delay in data transmission in the PDCP layer.

According to one aspect of the present invention, a radio communication device that transmits and receives a protocol data unit in a packet data convergence protocol layer located above a radio link control layer includes a status report generating section that generates a status report that indicates reception status of the protocol data unit in the packet data convergence protocol layer; and a status report transmitting section that transmits to a destination radio communication device of the radio communication device in the packet data convergence protocol layer the status report generated by the status report generating section. The status report generating section deletes, when the size of the protocol data unit that includes the status report exceeds a predetermined threshold, an excess part of the status report that exceeds the predetermined threshold. The status report transmitting section transmits to the destination radio communication device the protocol data unit that includes the status report from which the excess part has been deleted.

According to another aspect of the present invention, a radio communication device that transmits and receives a protocol data unit in a packet data convergence protocol layer located above a radio link control layer, includes a status report receiving unit that receives from a destination radio communication device of the radio communication device in the packet data convergence protocol layer a status report that indicates reception status of the protocol data unit in the packet data convergence protocol layer; and a retransmission controlling unit that controls retransmission of the protocol data unit based on the status report received by the status report receiving unit. In the status report, an excess part of the protocol data unit of which the size exceeds a predetermined threshold is deleted. The retransmission controlling unit retransmits the protocol data unit for which the reception status is not included in the status report and that is already transmitted to the destination radio communication device.

According to still another aspect of the present invention, a radio communication method that transmits and receives a protocol data unit in a packet data convergence protocol layer located above a radio link control layer, includes generating includes a radio communication device generating a status report that indicates reception status of the protocol data unit in the packet data convergence protocol layer; and transmitting includes the radio communication device transmitting to a destination radio communication device of the radio communication device in the packet data convergence protocol layer the generated status report. The generating the status report includes deleting, when the size of the protocol data unit that includes the status report exceeds a predetermined threshold, an excess part of the status report that exceeds the predetermined threshold. The transmitting the status report includes transmitting to the destination radio communication device the protocol data unit that includes the status report from which the excess part has been deleted.

According to still another aspect of the present invention, a radio communication device that transmits and receives a protocol data unit in a packet data convergence protocol layer located above a radio link control layer, includes a status report generating section that generates a status report that indicates reception status of the protocol data unit in the packet data convergence protocol layer; and a status report transmitting section that transmits to a destination radio communication device of the radio communication device in the packet data convergence protocol layer the status report generated by the status report generating section. When the size of the protocol data unit that includes the status report exceeds a predetermined threshold, the status report generating section splits the status report and generates status report pieces. The status report transmitting section transmits to the destination radio communication device the protocol data unit that includes the status report pieces.

According to still another aspect of the present invention, a radio communication method that transmits and receives a protocol data unit in a packet data convergence protocol layer located above a radio link control layer, includes generating includes a radio communication device generating a status report that indicates reception status of the protocol data unit in the packet data convergence protocol layer; and transmitting includes the radio communication device transmitting the generated status report to a destination radio communication device of the radio communication device in the packet data convergence protocol layer. The generating the status report includes, when the size of the protocol data unit that includes the status report exceeds a predetermined threshold, splitting the status report to generate status report pieces. The transmitting the status report includes transmitting to the destination radio communication device the protocol data unit that includes the status report pieces.

Exemplary embodiments of the present invention will be explained below with reference to the accompanying drawings. In the drawings, structural elements having the same function or configuration are indicated by the same or similar reference numerals and the explanation thereof is appropriately omitted.

First Embodiment (1) Overall Structural Configuration of Mobile Communication System FIG. 1 is an overall structural diagram of a mobile communication system 10 according to the present embodiment. As shown in FIG. 1, the mobile communication system 10 is a radio communication system in accordance with Long Term Evolution (including LTE and LTE-Advanced). The mobile communication system 10 includes a radio access network 20, a user device 100 (hereinafter, "UE 100"), and a radio base station 200 (hereinafter, "eNB 200").

The radio access network 20 is Evolved Universal Terrestrial Radio Access Network (E-UTRAN) stipulated in the 3rd Generation Partnership Project (3GPP) and includes the eNB 200.

The mobile communication system 10 is not necessarily limited to the LTE (E-UTRAN). For example, the radio access network 20 can be a radio access network including a radio base station that performs radio communication with the UE 100 stipulated as 5G.

The UE 100 and the eNB 200 perform LTE radio communication. In the present embodiment, in particular, the eNB 200 transmits to the UE 100 PDCP PDU 300, which is a downlink protocol data unit (PDU) in a packet data convergence protocol (PDCP) layer. Similarly, the UE 100 transmits to the eNB 200 an uplink PDCP PDU 300.

In other words, the UE 100 and the eNB 200 transmit and receive the PDCP PDU 300 in the packet data convergence protocol layer.

FIGS. 2(a) and 2(b) are diagrams showing examples of a retransmission control performed on the PDCP PDU in the PDCP layer at the time of HO/reconnection. FIG. 2(a) shows reception status of the PDCP PDU 300 before the handover to another cell or reconnection to a cell (HO/reconnection) is performed. FIG. 2(b) shows retransmission status of the PDCP PDU 300 after the HO/reconnection is performed.

As shown in FIG. 2(a), UE (PDCP Rx) has already received the PDCP PDUs 300 of #0, #1, #2, and #6 from eNB (PDCP Tx). On the other hand, the UE has failed to receive the PDCP PDUs 300 of #3, #4, and #5.

The eNB confirms an acknowledgment (RLC-ACK) from the UE in the radio link control (RLC) layer. As shown in FIG. 2(a), the eNB has confirmed the RLC-ACK for the PDCP PDUs 300 of sequence numbers (SN) #0, #1, and #2.

On the other hand, because the UE has failed to receive the PDCP PDUs 300 of #3, #4, and #5, even though the PDCP PDUs 300 of #3, #4, and #5 have been transmitted to the UE, the RLC-ACKs for these PDCP PDUs are unconfirmed on the eNB side. Furthermore, the PDCP PDU 300 of #7 is yet to be transmitted by the eNB.

In such a reception status of the PDCP PDUs 300, when the UE performs an HO/reconnection, as shown in FIG. 2(*b*), the UE transmits PDCP status report to the eNB. In this example, a PDCP status report including bits that indicate the PDCP PDU 300 of SN #6 is already received is transmitted to the eNB.

A destination eNB for the HO/reconnection sequentially transmits (retransmits) the PDCP PDUs 300 of #3, #4, and #5 for which the RLC-ACK is unconfirmed. On the other hand, because the PDCP status report shows that #6 is already received by the UE, the eNB cancels the retransmission thereof.

In this manner, an object of the PDCP is to notify the eNB of reception status in the PDCP level in the UE and avoid double transmission of PDUs in the PDCP level after the HO/reconnection of the UE is performed.

The PDCP is located above the RLC layer and is one of the sub-layers of layer 2. The PDCP provides functions such as concealment, validity check, and header compression in that sub-layer.

(2) Functional Block Configuration of Mobile Communication System

A functional block configuration of the mobile communication system 10 is explained below. Specifically, functional block configurations of the UE 100 and the eNB 200 are explained.

(2.1) UE 100

Figure 3:
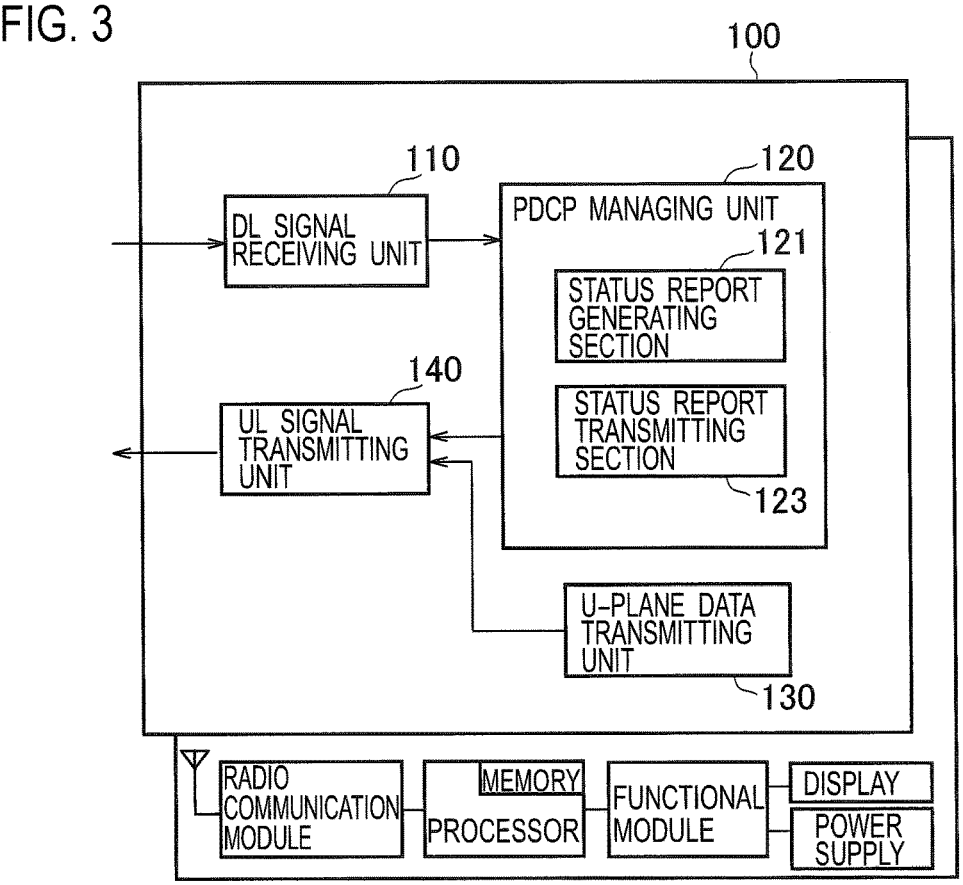
FIG. 3 is a functional block diagram of UE 100.

FIG. 3 is a functional block diagram of the UE 100. As shown in FIG. 3, the UE 100 includes DL signal receiving unit 110, PDCP managing unit 120, U-plane data transmitting unit 130, and UL signal transmitting unit 140.

Furthermore, as shown in FIG. 3, each functional block of the UE 100 is implemented by hardware elements such as a radio communication module, a processor (including a memory), a functional module (user IF, position detection, camera, audio and video, and the like), a display, and a power supply (such as a battery).

The DL signal receiving unit 110 receives a downlink signal (DL signal) transmitted from the eNB 200. Specifically, the DL signal receiving unit 110 receives a radio signal according to the 3GPP specifications, and outputs a demodulated upper layer signal. The DL signal receiving unit 110 outputs to the PDCP managing unit 120 the PDCP PDU, which is PDCP layer signal.

The PDCP managing unit 120 manages the operations performed in the PDCP layer. Specifically, the PDCP managing unit 120 manages generation and transmission (including retransmission control) of the PDCP PDU. In particular, the PDCP managing unit 120 includes a status report generating section 121 and a status report transmitting section 123.

The status report generating section 121 generates a status report (PDCP status report) that indicates reception status of a protocol data unit in the packet data convergence protocol layer.

Specifically, the status report generating section 121 generates PDCP control PDU that includes the PDCP status report as per the main standard content of 3GPP TS 36.323. The eNB 200 specifies for each radio bearer (ORB) whether to transmit the PDCP status report or not. The status report generating section 121 generates, when the transmission of the PDCP status report is specified, the PDCP status report of the corresponding radio bearer.

In the present embodiment, the status report generating section 121 deletes, when the size of the PDCP PDU that includes the PDCP status report exceeds a predetermined threshold, a part of the PDCP status report that exceeds the predetermined threshold (eliminates the excess part from the information notified via the PDCP status report).

Furthermore, the status report generating section 121 can determine, based on instructions from the eNB 200 (destination radio communication device), whether to delete the excess part of the PDCP status report or not.

The status report transmitting section 123 transmits the PDCP status report generated by the status report generating section 121. Specifically, the status report transmitting section 123 transmits the PDCP status report to a destination eNB 200 of the UE 100 in the PDCP layer.

In the present embodiment, the status report transmitting section 123 transmits to the eNB 200 the PDCP PDU that includes the PDCP status report from which the excess part is deleted.

Moreover, when transmitting a PDCP PDU that includes the PDCP status report from which the excess part is deleted, the status report transmitting section 123 can transmit a PDCP PDU that includes an indicator that indicates deletion of the excess part. Furthermore, the status report transmitting section 123 can transmit a PDCP PDU that includes an indicator that indicates the size of the excess part.

The U-plane data transmitting unit 130 processes user plane (U-plane) data, and transmits that data. Specifically, the U-plane data transmitting unit 130 generates a PDCP PDU that includes the U-plane data, specifically, generates PDCP data PDU, and transmits the generated PDCP data PDU to the eNB 200.

The UL signal transmitting unit 140 transmits an uplink signal (UL signal). Specifically, the UL signal transmitting unit 140 modulates the PDCP PDU output from the PDCP managing unit 120 and the U-plane data transmitting unit 130, and transmits a radio signal according to the 3GPP specifications.

(2.2) eNB 200

Figure 4:
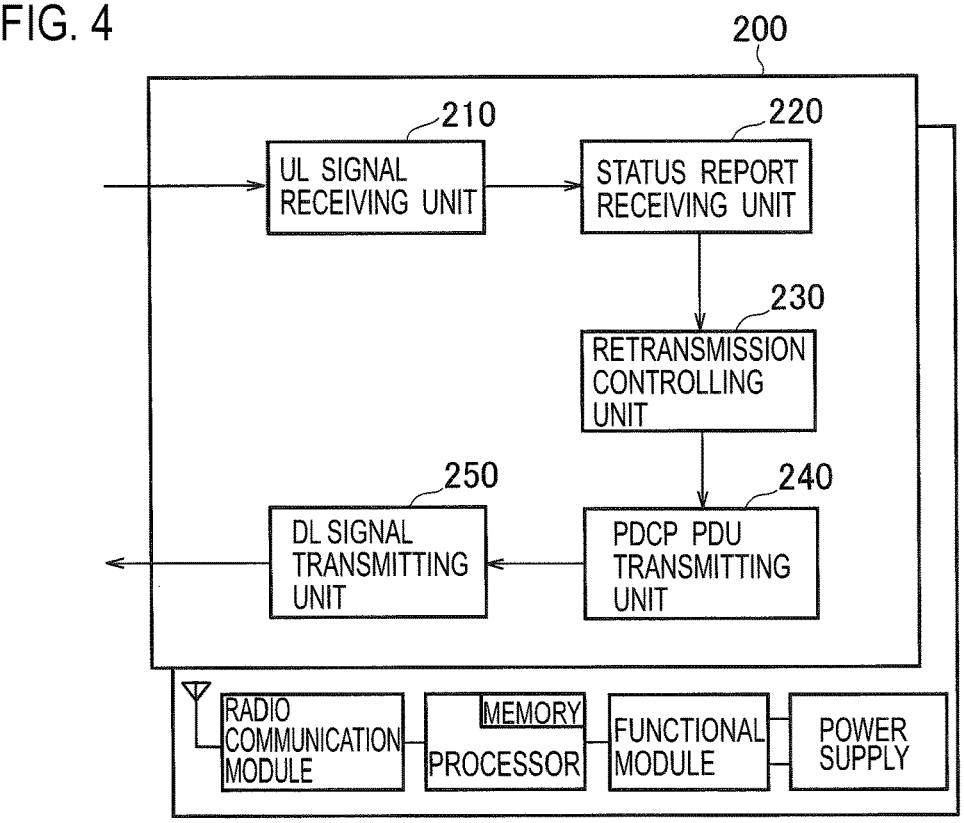
FIG. 4 is a functional block diagram of eNB 200.

FIG. 4 is a functional block diagram of the eNB 200. As shown in FIG. 4, the eNB 200 includes UL signal receiving unit 210, a status report receiving unit 220, a retransmission controlling unit 230, PDCP PDU transmitting unit 240, and DL signal transmitting unit 250.

As shown in FIG. 4, each functional block of the eNB 200 is implemented by hardware elements such as a radio communication module, a processor (including a memory), a functional module (network IF and the like), and a power supply.

The UL signal receiving unit 210 receives the uplink signal (UL signal) transmitted from the UE 100. Specifically, the UL signal receiving unit 210 receives the radio signal according to the 3GPP specifications, and outputs a demodulated upper layer signal.

The UL signal receiving unit 210, in particular, outputs a demodulated PDCP PDU to the status report receiving unit 220.

The status report receiving unit 220 receives from the UE 100 (destination radio communication device) a status report (PDCP status report) that indicates reception status of the PDCP PDU.

Specifically, the status report receiving unit 220 receives the PDCP status report included in the PDCP PDU (PDCP control PDU) output by the UL signal receiving unit 210. The status report receiving unit 220 notifies the retransmission controlling unit 230 of the contents of the received PDCP status report.

Moreover, in the present embodiment, as explained above, when the size of the PDCP PDU exceeds a predetermined threshold, the excess part from the PDCP status report is deleted. Accordingly, the status report receiving unit 220 may receive a PDCP status report from which a part of the contents has been deleted.

The retransmission controlling unit 230 controls, based on the PDCP status report received by the status report receiving unit 220, retransmission of the PDCP PDU. Specifically, the retransmission controlling unit 230 retransmits the PDCP PDU for which non-reception by the UE 100 is indicated in the PDCP status report. Furthermore, the retransmission controlling unit 230 specifies for each radio bearer whether to transmit the PDCP status report or not.

Moreover, the retransmission controlling unit 230 retransmits to the UE 100, upon receiving the PDCP status report from which a part of the contents has been deleted, PDCP PDU for which reception status is not included in the PDCP status report and that is already transmitted.

In other words, the retransmission controlling unit 230 considers that the UE 100 has not received all the PDCP PDUs for which reception status is not included in the PDCP status report because a part of the contents thereof has been deleted, and retransmits those PDCP PDUs.

The PDCP PDU transmitting unit 240 transmits the PDCP PDU to the UE 100. Specifically, the PDCP PDU transmitting unit 240 transmits the PDCP data PDU and the PDCP control PDU.

The PDCP data PDU is PDU that mainly includes data such as the U-plane data, and the PDCP control PDU is PDU that includes control information of header compression (ROHC feedback and the like) or the PDCP status report.

Moreover, the PDCP PDU transmitting unit 240 retransmits the PDCP PDU specified by the retransmission controlling unit 230.

The DL signal transmitting unit 250 transmits a downlink signal (DL signal). Specifically, the DL signal transmitting unit 250 modulates the PDCP PDU output from the PDCP PDU transmitting unit 240, and transmits a radio signal according to the 3GPP specifications.

(3) Operation of Mobile Communication System

An operation of the mobile communication system 10 is explained below. Specifically, generation and transmission of the PDCP status report by the UE 100, and retransmission of the PDCP PDU by the eNB 200 are explained.

(3.1) Generation of PDCP Status Report

FIG. 5 is a diagram showing an operation flow of the PDCP status report generation by the UE 100. As shown in FIG. 5, the UE 100 performs the HO/reconnection (S10). The UE 100 performs handover (HO) or reconnection to the cell in scenarios such as improvement in quality of the radio signal from the neighboring cell due to the movement of the UE 100 (in the case of the HO), deterioration of the quality of the serving cell, layer 2 error, handover failure (in the case of reconnection), and the like.

Such a handover or reconnection to the cell triggers generation of the PDCP status report. The UE 100 determines whether the transmission of the PDCP status report for each set radio bearer is instructed by the eNB 200 or not (S20).

When instructed by the eNB 200 to transmit the PDCP status report, the UE 100 calculates the assumed size of the PDCP status report (S30).

The eNB 200 can, however, notify the UE 100 in advance of a maximum permissible size (predetermined threshold) of the PDCP control PDU that includes the PDCP status report. Alternatively, instead of being notified, the size can be a predetermined fixed value. For example, the size can be a value derived by considering the size of the PDCP SDU (8188 bytes) and a header part.

Moreover, for the maximum permissible size, different values can be used for each type of PDCP control PDU, for each radio bearer, or for uplink and downlink.

Furthermore, the maximum permissible size of the PDCP control PDU will be explained later.

Specifically, the UE 100 calculates, based on the sequence number of the already received PDCP PDU, the size of a bitmap (explained later) included in the PDCP status report, and calculates the entire size of the PDCP status report.

The UE 100 determines whether the assumed size of the PDCP status report exceeds the threshold (S40).

When the assumed size of the PDCP status report is equal to or less than the threshold, the UE 100 as per the routine generates a normal bitmap that indicates reception status of the PDCP PDU (S50).

On the other hand, when the assumed size of the PDCP status report exceeds the threshold, the UE 100 deletes a part of the bitmap information so that the size of the PDCP status report is equal to or less than the predetermined size, specifically, equal to or less than the maximum permissible size (predetermined threshold) of the PDCP control PDU that includes the PDCP status report (S60).

Specifically, the UE 100 deletes from the bitmaps followed by the FMS (First Missing SN) a part of the bitmap that exceeds the threshold. In other words, the UE 100 deletes a bitmap that cannot be included in PDCP control PDU of the maximum permissible size, more specifically, a bitmap that corresponds to PDCP PDU for which the SN is large and is transmitted later.

Furthermore, the UE 100 can delete the excess part only when such deletion is instructed from the eNB 200, and send the PDCP status report that also includes the excess part if there is no instruction. The instruction for deletion from the eNB 200 can be implicitly notified to the UE 100 by setting an extended PDCP SN (23 bit PDCP SN).

FIGS. 6(a) and 6(b) are diagrams showing examples of a PDCP PDU that includes the PDCP status report constituted by the normal bitmap and a PDCP PDU that includes the PDCP status report from which a part of the bitmap is deleted.

FIG. 6(a) shows PDCP PDU 311 that includes the PDCP status report constituted by the normal bitmap. FIG. 6(b) shows PDCP PDU 313 that includes the PDCP status report from which a part of the bitmap is deleted.

As shown in FIG. 6(a), the PDCP PDU 311 is constituted by a fixed part, the First Missing SN (FMS), and a bitmap.

The fixed part includes bits that indicate whether the PDCP PDU 311 is the PDCP control PDU or the PDCP data PDU, and information that indicates type of the PDU. The FMS indicates a sequence number (SN) of the oldest non-received PDCP PDU.

Furthermore, in FIGS. 6(a) and 6(b), one horizontal row means one octet (8 bits). However, the fixed part need not necessarily be an octet. Moreover, following the extension of the sequence numbers (SN) of the PDCP PDU, 3 octets are allocated to the FMS.

The bitmap indicates reception status (0 (NG) or 1 (OK)) of the PDCP PDU corresponding to the FMS and PDCP PDUs of the sequence numbers subsequent to the FMS.

The PDCP PDU 311 includes all the bitmaps of the PDCP PDUs transmitted by the eNB 200 without deleting a part (excess part) of the PDCP status report.

On the other hand, as shown in FIG. 6(b), a part of the PDCP status report is deleted in the PDCP PDU 313. Specifically, an excess part of the PDCP status report (bitmap) that exceeds the predetermined threshold is deleted. The predetermined threshold is not limited to any particular value. However, as explained above, if the possibility of the maximum size of the PDCP PDU which considers the size of the PDCP SDU being stipulated is considered as the implementation of the UE 100, the value derived by considering the size (8188 bytes) of the PDCP SDU and the header part can be set as the predetermined threshold.

Moreover, in the fixed part of the PDCP PDU 313, an indicator that indicates that the excess part of the PDCP status report is deleted, and an indicator that indicates the size of the excess part can be included.

FIGS. 7(*a*) and 7(*b*) are diagrams showing sequences of transmission and reception of the PDCP status report between the UE 100 and the eNB 200.

Specifically, FIG. 7(*a*) shows a sequence of the communication performed when the PDCP status report that includes bitmap of all the PDCP PDUs transmitted from the eNB 200 without deleting a part of the PDCP status report.

As shown in FIG. 7(*a*), the UE 100 triggers, upon executing the HO/reconnection, the transmission of the PDCP status report. At this time, assume that the SN length of the PDCP PDU is extended, and the UE 100 must transmit to the eNB 200 the PDCP status report of 500 kilobytes (kb).

In FIG. 7(*a*), because the UE 100 transmits the entire PDCP status report of 500 kb, the PDCP status report is split into a plurality of RLC PDUs to be transmitted to the eNB 200.

Accordingly, unless all the PDCP PDUs that include the PDCP status report split and transmitted from the UE 100 via the plurality of the RLC PDUs are received, the eNB 200 cannot restart scheduling of the downlink (DL) signal.

On the other hand, in FIG. 7(*b*), the UE 100 transmits to the eNB 200 the PDCP status report from which a part of the PDCP status report (bitmap) that exceeds the predetermined threshold (about 50 kb) is deleted.

Accordingly, as soon as the eNB 200 receives the PDCP PDU that includes the PDCP status report from which the excess part that has exceeded the predetermined threshold is deleted, the eNB 200 can immediately restart the scheduling of the downlink (DL) signal.

Based on the received PDCP status report, specifically, based on contents of the FMS and the bitmap, the eNB 200 starts the retransmission of the PDCP PDU.

Moreover, the eNB 200 considers a PDCP PDU for which it is unclear whether the UE 100 has successfully received or not because a part of the PDCP status report is deleted as non-received by the UE 100, and retransmits that PDCP PDU.

(3.2) Size of PDCP Control PDU

In the present embodiment, as explained above, even if the size of the PDCP control PDU is set by assuming that the extended PDCP SN (23 bit PDCP SN) is used, the number of bits of the PDCP SN (sequence number) applicable to the PDCP control PDU is not limited to 23 bits, and any other number of bits specified in the 3GPP can be used.

In such a case, the maximum size of the PDCP control PDU can be specified by any of the following:

Maximum value of the bitmap
Maximum value of the PDCP control PDU

In the case of "maximum value of the bitmap", for example, if the SN is a 15-bit SN, $2^{15-1}$ (half of $2^{15}$) is applied. Furthermore, because the header part of the PDCP control PDU is not taken into consideration, even when the number of the PDCP SN is further extended in the future, it is not necessary to change the maximum value.

In the case of "maximum value of the PDCP control PDU", for example, if the SN is a 15-bit SN, ($2^{15-1}$+assumed header size) is applied. The assumed header size can be a predetermined PDCP SN (for example, 18 bits) or COUNT value (32 bits).

In the case of the maximum value of the PDCP control PDU that includes the assumed header size, when the number of the PDCP SN is further extended in the future, extension of the setting range is necessary. However, because it is specified (3GPP TS 36.323) that the PDCP SN uses lower bits of the COUNT value, the PDCP SN can only be extended up to the COUNT value at most. Therefore, if the maximum value of the PDCP control PDU is set on the premise of the maximum value explained above, even if the PDCP SN is extended in the future, it is not necessary to revise the maximum value according to the extension.

Moreover, the "maximum value of the bitmap" or the "maximum value of the PDCP control PDU" explained above can be set to a setting range as follows. Specifically, an integral multiple of the maximum value of the bitmap (or PDCP control PDU) corresponding to the PDCP SN (for example, 15-bit SN) that is shorter than the PDCP SN that corresponds to the maximum value is set.

More specifically, because the size of the bitmap in the 15-bit SN is 2048 bytes ($2^{15-1}/8$), an integral multiple of 2048 bytes is set as the maximum value. In the case of "maximum value of the PDCP control PDU", however, (integral multiple of 2048 bytes+assumed header size) is set as the maximum value.

Alternatively, a value obtained by multiplying the size of the PDCP control PDU with a "predetermined ratio" can be set as the maximum value. The "predetermined ratio" includes a value (for example, 15%) based on the error ratio in the MAC layer.

Furthermore, when splitting and transmitting the bitmap information to a plurality of PDCP control PDUs, the maximum value for each PDCP control PDU can be different. For example, the maximum value for the first PDCP control PDU can be 2000 bytes, the maximum value for the next PDCP control PDU can be 1500 bytes, and the like.

The status report generating section 121 of the UE 100 can generate a PDCP control PDU that includes the bitmap (PDCP status report) determined in accordance with the method explained above.

Moreover, at the time of the handover, the maximum value can be instructed from the eNB 200 (Target-eNB) to the UE 100 by using an HO command. Alternatively, the maximum value can be instructed from Source-eNB to the UE 100 by using notification information (SIB and the like) or individual signal (RRC connection reconfiguration) in advance. Furthermore, at the time of reconnecting the UE 100 with the eNB 200, the maximum size can be instructed from the eNB 200 to which the UE 100 is connected, or can be instructed by using RRC connection re-establishment or RRC connection reconfiguration transmitted during the reconnection procedure.

(4) Effects and Advantages

According to the first embodiment, the following effects and advantages can be obtained. As explained above, the UE 100 (status report generating section 121) deletes, when the size of a PDCP PDU that includes the PDCP status report exceeds the predetermined threshold, the excess part of the PDCP status report that has exceeded the predetermined threshold. Moreover, the eNB 200 (retransmission controlling unit 230) retransmits the PDCP PDU for which reception status is not included in the PDCP status report because the excess part is deleted and that is already transmitted to the UE 100.

In other words, when the PDCP PDU already has been transmitted to the UE 100 and the information (bitmap) that indicates reception status of that PDCP PDU is not included in the PDCP status report, the eNB 200 considers that PDCP PDU to be not received by the UE 100 and retransmits that PDCP PDU.

Accordingly, when the peak throughput of the UE 100 is low or even if the maximum size of the transmissible PDCP PDU is small, retransmission control in the PDCP layer can be reliably performed. Moreover, because the eNB 200 can immediately start the retransmission of the PDCP PDU as soon as the eNB 200 receives the PDCP status report from which the part exceeding the predetermined threshold is deleted, processing delay in the PDCP layer becomes an unlikely occurrence.

In other words, according to the present embodiment, even if the size of the PDCP status report increases because of extension of the SN length of the PDCP PDU, the need for improvement in the processing capacity of the UE 100 can be avoided, while at the same time delay in data transmission in the PDCP layer can be prevented.

According to the present embodiment, in particular, the UE 100 simply needs to delete the excess part of the PDCP status report that exceeds the predetermined threshold. Accordingly, the operation of the UE 100 is simplified, and the implementation of the UE 100 becomes comparatively easy.

In the present embodiment, the UE 100 can determine, based on the instruction from the eNB 200, whether to delete the excess part of the PDCP status report or not. Accordingly, the size of the PDCP status report can be dynamically changed in accordance with the conditions of the radio access network 20, and a more flexible retransmission control in the PDCP layer can be realized.

In this embodiment, the UE 100 can transmit a PDCP PDU that includes an indicator that indicates that the excess part of the PDCP status report has been deleted, and an indicator that indicates the size of the excess part.

With this configuration, the eNB 200 can immediately recognize the status of the PDCP status report, and can promptly start the retransmission of the PDCP PDU.

Second Embodiment

A second embodiment of the present invention is explained next. In the present embodiment, when the size of the PDCP status report exceeds the predetermined threshold, the PDCP status report is split. An explanation is mainly given below about the portions that are different from the first embodiment, and an explanation of portions that are similar is accordingly omitted.

(1) Functional Block Configuration of Mobile Communication System

As shown in FIGS. 3 and 4, the UE 100 and the eNB 200 according to the present embodiment have the same functional block configuration as the UE 100 and the eNB 200 according to the first embodiment.

The status report generating section 121 according to the present embodiment generates, when the size of the PDCP PDU that includes the PDCP status report exceeds the predetermined threshold, status report pieces by splitting the PDCP status report.

Moreover, the status report generating section 121 can determine, based on the instruction from the eNB 200, whether to generate the status report pieces or not. Furthermore, the eNB 200 can notify the UE 100 of a threshold for the size of the PDCP PDU, and when it is not necessary to generate the status report pieces by setting the threshold to infinity, the eNB 200 can notify the UE 100 that the generation of the status report pieces is unnecessary.

The status report transmitting section 123 transmits to the eNB 200 (destination radio communication device) PDCP PDU that includes the status report pieces.

Moreover, the status report transmitting section 123 can transmit a PDCP PDU that includes an indicator that indicates the number of the status report pieces. Alternatively, the status report transmitting section 123 can transmit a PDCP PDU that includes an indicator to indicate whether any subsequent status report piece exists or not.

The U-plane data transmitting unit 130 transmits, in an interval during which a plurality of PDCP PDUs each of that includes the status report piece is transmitted by the status report transmitting section 123, a PDCP PDU that includes the user plane (U-plane) data.

Specifically, the U-plane data transmitting unit 130 transmits, in an interval during which PDCP control PDUs each of which includes the status report piece are transmitted, the PDCP data PDU that includes the U-plane data.

Immediately after receiving the first status report piece, based on the status report piece received from the UE 100, the retransmission controlling unit 230 of the eNB 200 according to the present embodiment starts retransmission of the PDCP PDU.

(2) Operation of Mobile Communication System

Operation of the mobile communication system 10 is explained below. Specifically, generation and transmission of the PDCP status report by the UE 100, and retransmission of the PDCP PDU by the eNB 200 are explained.

Figure 8:
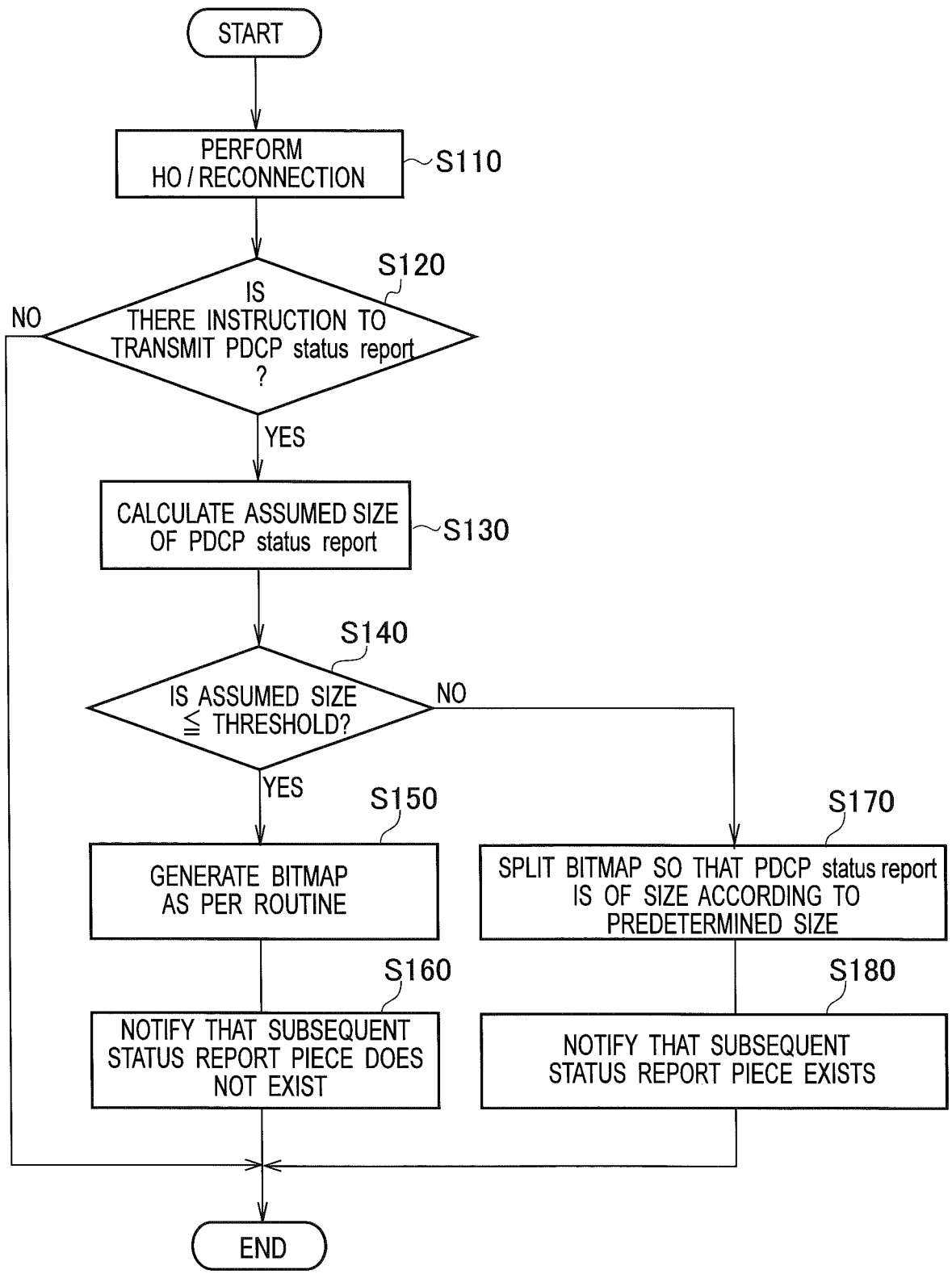
FIG. 8 is a diagram showing an operation flow of PDCP status report generation by UE 100 according to a second embodiment of the invention.

FIG. 8 shows an operation flow of the PDCP status report generation by the UE 100. Steps S110 to S140 shown in FIG. 8 are similar to Steps S10 to S40 shown in FIG. 5.

If the assumed size of the PDCP status report is equal to or less than the threshold, the UE 100 as per the routine generates a normal bitmap that indicates reception status of the PDCP PDU (S150).

Moreover, the UE 100 notifies the eNB 200 that there is no subsequent status report piece (S160).

On the other hand, if the assumed size of the PDCP status report exceeds the threshold, to make the size of the PDCP PDU equal to or less than the predetermined size, the UE 100 splits the PDCP status report (bitmap), and assigns bitmap pieces, in other words, the status report pieces, to a plurality of the PDCP PDUs (S170).

Moreover, the UE 100 notifies the eNB 200 that there are subsequent status report pieces (S180).

FIGS. 9(*a*) and 9(*b*) are diagrams showing examples of a PDCP PDU that includes a PDCP status report constituted by the normal bitmap, and PDCP PDUs each of which includes the PDCP status report constituted by the split bitmap.

PDCP PDU 321 shown in FIG. 9(*a*) has the same configuration as the PDCP PDU 311 shown in FIG. 6(*a*). The PDCP PDU 321 is constituted by a fixed part, First Missing SN (FMS), and a bitmap.

FIG. 9(*b*) shows PDCP PDUs 323*a* to 323*d* each of which includes a status report piece obtained by splitting the bitmap shown in the PDCP PDU 321.

As shown in FIG. 9(*b*), a part of a bitmap (1) of the PDCP PDU 321 is assigned to the PDCP PDU 323*a*. With this configuration, the size of the PDCP PDU 323*a* can be kept equal to or less than the predetermined threshold.

Similarly, parts of bitmaps (2) to (4) of the PDCP PDU 321 are assigned to the PDCP PDUs 323b to 323d respectively. Moreover, the PDCP PDUs 323b to 323d include Starting SN instead of the FMS. The Starting SN implies the sequence number (SN) of the PDCP PDU corresponding to the first bit of the bitmap included in that PDCP PDU.

However, the Starting SN is not mandatory. The eNB 200 that sequentially receives the PDCP PDUs 323a to 323d can refer to the bitmap (status report piece) included in the immediately preceding PDCP PDU and identify the sequence number of the PDCP PDU corresponding to the first bit of the bitmap included in the subsequent PDCP PDU. However, use of the Starting SN certainly accelerates the process.

Alternatively, the size of the PDCP PDU (specifically, PDCP control PDU) can be further reduced by using the Starting SN.

For example, when one value (0 or 1) is repeated in the bitmap, the bitmap having that repeated part cannot be notified and the SN of the first PDCP PDU with a different value can be set as the Starting SN.

Moreover, with this configuration, even if the status report pieces are assigned to the plurality of the PDCP PDUs, it is not necessary to change the configuration of fields included in PDCP PDU protocol format between the PDUs, and it is possible to simplify the implementation without needing to define a plurality of formats.

Alternatively, the SN (in other words, equivalent to FMS) of PDCP PDU subsequent to the PDCP PDU that corresponds to the last bit of the bitmap included in the immediately preceding PDCP PDU which was not initially received in the UE 100 can be set as the Starting SN.

The fixed part of each of the PDCP PDUs 323a to 323d includes an indicator 325 that indicates whether the subsequent status report piece exists or not. Furthermore, as explained above, the indicator 325 can be an indicator that indicates the number of the status report pieces.

Figure 10A:
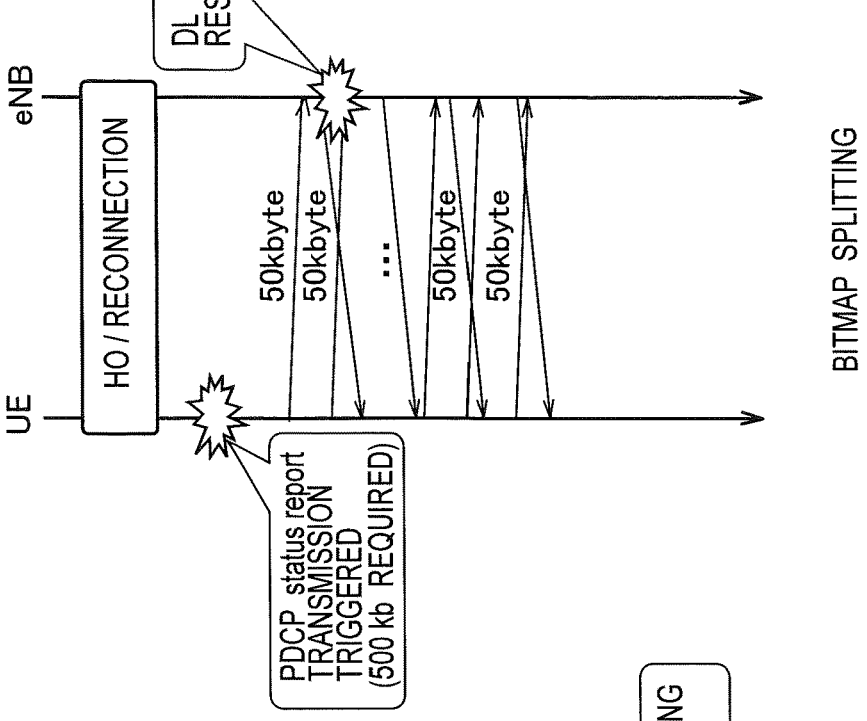
FIGS. 10(a) and 10(b) are diagrams showing sequences of transmission and reception of the PDCP status report between the UE 100 and eNB 200 according to the second embodiment.
Figure 10B:
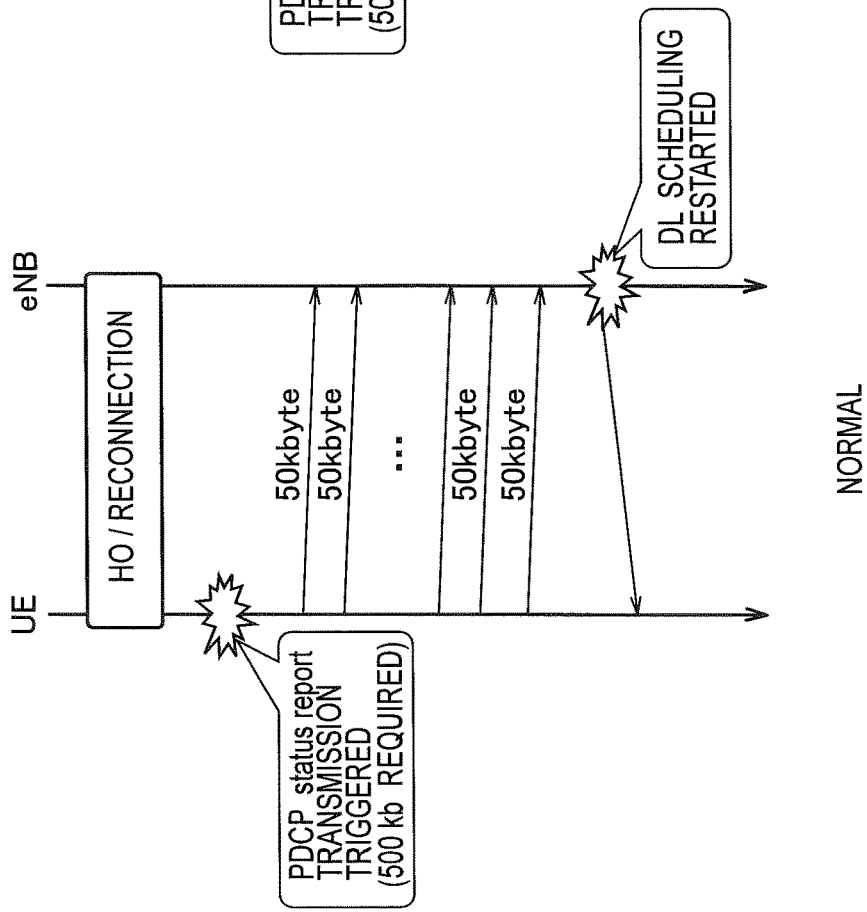

FIGS. 10(*a*) and 10(*b*) are diagrams showing sequences of transmission and reception of the PDCP status report between the UE 100 and the eNB 200.

FIG. 10(*a*) is similar to FIG. 7(*a*), and shows a sequence of communication performed when the PDCP status report that includes bitmap of all the PDCP PDUs transmitted from the eNB 200 is transmitted.

On the other hand, in FIG. 10(*b*), the UE 100 sequentially transmits to the eNB 200 the PDCP PDUs 323a to 323d each of that includes the status report piece as shown in FIG. 9(*b*).

Moreover, the UE 100 can transmit the PDCP data PDU during the transmission of the PDCP PDUs 323a to 323d, which are the PDCP control PDUs. For example, the UE 100 can transmit the PDCP data PDU during the transmission of the PDCP PDUs 323a and 323b.

Furthermore, the transmission amount of the PDCP data PDU can be specified by the eNB 200 or a fixed value can be used, depending on the time or data amount.

As soon as the eNB 200 receives the PDCP PDU 323a, which is the first PDCP PDU that includes the status report piece, the eNB 200 can immediately restart the scheduling of the downlink (DL) signal. Accordingly, as shown in FIG. 10(*b*), the eNB 200 need not wait for the reception of all PDCP PDUs that include the PDCP status report.

(3) Effects and Advantages

According to the second embodiment explained above, the following effects and advantages can be obtained when compared with the first embodiment. As explained above, the UE 100 (status report generating section 121) generates, when the size of the PDCP PDU that includes the PDCP status report exceeds the predetermined threshold, status report pieces by splitting the PDCP status report. Moreover, the eNB 200 (retransmission controlling unit 230) starts the retransmission of the PDCP PDU as soon as the eNB 200 receives the first status report piece.

With this configuration, similar to the first embodiment, even if the size of the PDCP status report increases because of extension of the SN length of the PDCP PDU, the need for improvement in the processing capacity of the UE 100 can be avoided, while at the same time delay in data transmission in the PDCP layer can be prevented.

Particularly, because the eNB 200 can immediately start the retransmission of the PDCP PDU as soon as the eNB 200 receives the first status report piece, the processing delay in the PDCP layer becomes an unlikely occurrence.

Furthermore, in the present embodiment, a versatile method that uses the mechanism of the existing PDCP status report is adopted, and transition from the existing implementation, too, is thought to be easy. Moreover, when compared to the first embodiment, reception status of all the PDCP PDUs transmitted by the eNB 200 is reported to the eNB 200 via the status report pieces. As a result, the information in the PDCP status report is not lost and the efficiency of the communication can be improved.

In the present embodiment, similar to the first embodiment, the UE 100 can determine, based on the instruction from the eNB 200, whether to generate the status report pieces or not, and can transmit the PDCP PDU that includes an indicator that indicates the number of the status report pieces or an indicator that indicates whether any subsequent status report piece exists or not. Similar to the first embodiment, these characteristics contribute to realize a more flexible retransmission control in the PDCP layer, or a faster start of retransmission of the PDCP PDU.

Third Embodiment

A third embodiment of the present invention is explained next. In this embodiment, the format of the PDCP status report is not a bitmap (normal status report) format, and is changed to a format (cumulative status report) that shows a sequence number of the PDCP PDU that was successfully received. In other words, a PDCP PDU for which acknowledgment (ACK) is generated or a sequence number of a PDCP PDU that was not successfully received (i.e., aPDCP PDU for which negative acknowledgment (NACK) is generated). An explanation is mainly given below about the portions that are different from the first embodiment and the second embodiment, and an explanation of portions that are similar is accordingly omitted.

(1) Functional Block Configuration of Mobile Communication System

As shown in FIGS. 3 and 4, the UE 100 and the eNB 200 according to the present embodiment have the same functional block configuration as the UE 100 and the eNB 200 according to the first embodiment.

The status report generating section 121 according to the present embodiment can generate the cumulative status report, which is PDCP status report constituted by accumulating the sequence number of the PDCP PDU for which the reception can be confirmed (cumulative ACK).

Moreover, the status report generating section 121 can also generate the cumulative status report, which is PDCP status report constituted by accumulating the sequence number of the PDCP PDU for which the reception cannot be confirmed (cumulative NACK).

Specifically, the status report generating section 121 sequentially generates a cumulative status report constituted by the sequence numbers of the PDCP PDUs for which reception can be confirmed, starting with the PDCP PDU for which the reception can be confirmed first. Similarly, the status report generating section 121 sequentially generates a cumulative status report constituted by the sequence numbers of the PDCP PDUs for which reception cannot be confirmed, starting first with the PDCP PDU for which reception cannot be confirmed.

Furthermore, the status report generating section 121 can also generate a normal status report having a format that indicates the PDCP PDU for which reception can be confirmed and the PDCP PDU for which reception cannot be confirmed in a bitmap. In other words, the status report generating section 121 can generate the normal status report and the cumulative status report.

Moreover, the status report transmitting section 123 can transmit, when the size of the cumulative status report constituted by the cumulative ACK is smaller than the size of the cumulative status report constituted by the cumulative NACK, the cumulative status report constituted by the cumulative ACK.

The status report transmitting section 123 can transmit, when the size of the cumulative status report is smaller than the size of the normal status report, the cumulative status report.

The status report transmitting section 123 transmits the normal status report when both the size of the cumulative status report and the size of the normal status report are less than the predetermined threshold.

Moreover, when transmitting any cumulative status report constituted by either the cumulative ACK or the cumulative NACK depending on size, the status report transmitting section 123 can transmit PDCP PDU that includes an indicator that indicates whether the cumulative status report is constituted by the cumulative ACK or the cumulative NACK.

Moreover, the retransmission controlling unit 230 of the eNB 200 according to the present embodiment retransmits, based on the cumulative status report received from the UE 100, the PDCP PDU that is not received by the UE 100.

(2) Operation of Mobile Communication System

An operation of the mobile communication system 10 is explained below. Specifically, generation and transmission of the PDCP status report by the UE 100, and retransmission of the PDCP PDU by the eNB 200 are explained.

FIG. 11 shows an operation flow of the PDCP status report generation by the UE 100. Steps S210 and S220 shown in FIG. 11 are similar to Steps S10 and S20 shown in FIG. 5.

The UE 100 calculates the assumed size of the PDCP status report constituted by the normal bitmap, in other words, the assumed size of the normal status report (S230).

Moreover, the UE 100 calculates the assumed size of the PDCP status report constituted by the cumulative ACK, in other words, the assumed size of the cumulative status report (S240). Furthermore, instead of the cumulative ACK, the UE 100 can calculate the assumed size of the PDCP status report constituted by the cumulative NACK. Alternatively, as explained above, the UE 100 can be configured to calculate the assumed both the size of the PDCP status report constituted by the cumulative ACK and the size of the PDCP status report constituted by the cumulative NACK, and select the PDCP status report of a smaller size.

The UE 100 determines whether the assumed size of the PDCP status report constituted by the cumulative ACK is smaller than the assumed size of the PDCP status report constituted by the normal bitmap or not (S250).

When the assumed size of the PDCP status report constituted by the normal bitmap is same as or smaller than the assumed size of the PDCP status report constituted by the cumulative ACK, the UE 100 generates the PDCP status report (normal status report) constituted by the normal bitmap (S260).

On the other hand, when the assumed size of the PDCP status report constituted by the cumulative ACK is smaller than the assumed size of the PDCP status report constituted by the normal bitmap, the UE 100 generates the PDCP status report (cumulative status report) constituted by the cumulative ACK (S270).

However, the UE 100 can perform only the processing at Steps S240 and S270 without performing the processing at Steps S230, S250, and S260 explained above.

Moreover, when the assumed sizes of the PDCP status report constituted by the cumulative ACK and the PDCP status report constituted by the cumulative NACK are calculated, and the PDCP status report of a smaller size is selected, the UE 100 transmits PDCP PDU that includes an indicator to indicate whether the PDCP status report is a cumulative status report constituted by the cumulative ACK or a cumulative status report constituted by the cumulative NACK.

Figures 12A, 12B:
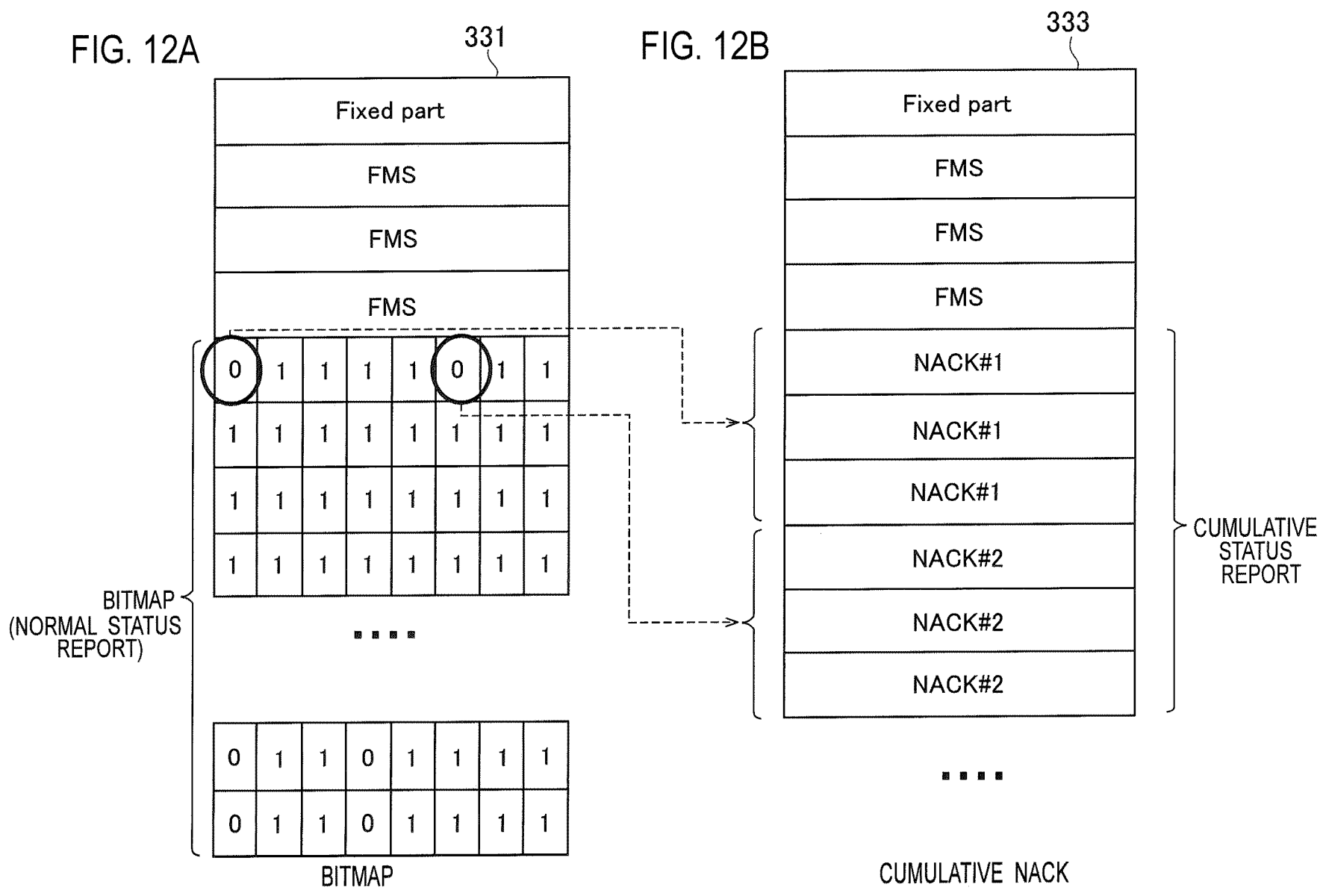

FIGS. 12(*a*) and 12(*b*) are diagrams showing examples of PDCP PDU that includes the PDCP status report constituted by the normal bit map, and PDCP PDU that includes the PDCP status report constituted by the cumulative NACK.

PDCP PDU 331 shown in FIG. 12(*a*) has the same configuration as the PDCP PDU 311 and the PDCP PDU 321 shown in FIGS. 6(*a*) and 9(*a*), respectively. The PDCP PDU 331 is constituted by Fixed part, First Missing SN (FMS), and a bitmap.

PDCP PDU 333 shown in FIG. 12(*b*) includes PDCP status report in which contents similar to the contents of the bitmap of the PDCP PDU 331 are represented in the format of the cumulative NACK.

Specifically, the sequence number of the PDCP PDU corresponding to the FMS is indicated by NACK #1 region (3 octets). Similarly, the sequence number of the subsequent PDCP PDU that is not received by the UE 100 is indicated by NACK #2 region, and thereafter, the sequence numbers of the non-received PDCP PDUs are indicated in the similar manner.

(3) Effects and Advantages

According to the third embodiment explained above, the following effects and advantages can be obtained. As explained above, the UE 100 (status report generating section 121) generates the PDCP status report (cumulative status report) constituted by accumulating the sequence number of the PDCP PDU for which the reception can be confirmed (cumulative ACK) or by accumulating the sequence number of the PDCP PDU for which the reception cannot be confirmed (cumulative NACK). Moreover, the eNB 200 (retransmission controlling unit 230) retransmits, based on the cumulative status report received from the UE 100, the PDCP PDU that is not received by the UE 100.

With this configuration, similar to the first and the second embodiments, even if the size of the PDCP status report increases because of extension of the SN length of the PDCP PDU, the need for improvement in the processing capacity of the UE 100 can be avoided, while at the same time delay in data transmission in the PDCP layer can be prevented.

Particularly, the cumulative status report according to the present embodiment is highly effective because, by using the cumulative ACK format when the number of the PDCP PDUs for which reception can be confirmed is significantly smaller compared to the number of the PDCP PDUs for which reception cannot be confirmed and, in reverse, by using the cumulative NACK format when the number of the PDCP PDUs for which reception cannot be confirmed is significantly smaller compared to the number of the PDCP PDUs for which reception can be confirmed, the size of the PDCP status report can be significantly reduced.

In the present embodiment, when the size of the cumulative status report is smaller than the size of the normal status report, the UE 100 (status report transmitting section 123) can transmit the cumulative status report.

With this configuration, regardless of the reception status of the PDCP PDU in the UE 100, a PDCP status report of a smaller size can be transmitted, and delay in data transmission in the PDCP layer can be effectively prevented.

In the present embodiment, the UE 100 (status report transmitting section 123) transmits the normal status report when both the size of the cumulative status report and the size of the normal status report are less than the predetermined threshold.

With this configuration, delay in data transmission in the PDCP layer can be prevented while following the mechanism of the existing PDCP status report as much as possible.

In the present embodiment, the UE 100 (status report transmitting section 123) can transmit, when the size of the cumulative status report constituted by the cumulative ACK is smaller than that of the cumulative status report constituted by the cumulative NACK, the cumulative status report constituted by the cumulative ACK.

With this configuration, the size of the PDCP status report can be further reduced, and the delay in data transmission in the PDCP layer can be more effectively prevented.

Moreover, in the present embodiment, the UE 100 (status report transmitting section 123) can transmit the PDCP PDU that includes an indicator that indicates whether the PDCP status report is the cumulative status report constituted by the cumulative ACK or the cumulative status report constituted by the cumulative NACK. Therefore, the eNB 200 can promptly recognize whether it is a cumulative status report constituted by the cumulative ACK or a cumulative status report constituted by the cumulative NACK, whereby the data transmission delay in the PDCP layer is more effectively prevented.

Other Embodiments

The present invention has been explained in detail by using the above mentioned embodiments; however, it will be self-evident to a person skilled in the art that the present invention is not limited to the embodiments explained herein and that the embodiments can be modified or improved in various ways.

For example, in the first and the second embodiments explained above, the size of the PDCP PDU was controlled so as to be equal to or less than the predetermined threshold by specifying the maximum permissible size (predetermined threshold) of the PDCP PDU. Alternatively, the size of the PDCP PDU can be controlled so as to be equal to or less than the predetermined threshold by specifying a maximum permissible size of the PDCP status report.

In the first to third embodiments explained above, even if a configuration where the UE 100 transmits to the eNB 200 PDCP control PDU that includes PDCP status report, and the eNB 200 controls retransmission of the PDCP PDU based on the PDCP status report is cited as an example, functions can be swapped between the UE 100 and the eNB 200. That is, the eNB 200 can transmit PDCP control PDU that includes PDCP status report to the UE 100, and the UE 100 can control retransmission of the PDCP PDU based on the PDCP status report.

In other words, if the UE 100 constitutes a radio communication device, then the eNB 200 constitutes a destination radio communication device. Inversely, if the eNB 200 constitutes a radio communication device, then the UE 100 constitutes a destination radio communication device. Therefore, in the scope of patent claims, the UE 100 constitutes a radio communication device or a destination radio communication device. Moreover, the eNB 200, too, constitutes a radio communication device or a destination radio communication device.

In the first to third embodiments explained above, although a configuration where various indicators are included in the PDCP PDU and specifically in the fixed part has been described as an example, instead of in the fixed part, the indicators could for example be included in the PDCP status report as a part of the structural elements thereof.

Moreover, in the first to third embodiments explained above, although the PDCP PDU has been described as an example, embodiments of the invention are not necessarily limited to the PDCP PDU. For example, the method of splitting the bitmap information to a plurality of the PDUs, similar to the status report pieces explained in the second embodiment, is not limited in application to the PDCP status report, and can be applied to other cases (such as PDU) in which the bitmap information is transmitted.

Furthermore, the order of processes in the sequences, flow charts, and the like in the embodiments explained above can be reshuffled as long as the order is kept consistent across sequences and flows.

Moreover, the terminology explained in the present description and/or the terminology necessary for understanding the present description can be replaced with the terminology having the same or similar meanings. For example, the terms "channel" and/or "symbol" can be replaced with the term "signal". Moreover, the term "signal" can be replaced with the term "message". Furthermore, the terms "system" and "network" can be used interchangeably.

Furthermore, the parameters and the like explained above can be represented by absolute values, can be expressed as relative values with respect to predetermined values, or can be represented by any other corresponding information. For example, a radio resource can be indicated by an index.

The eNB 200 (base station) can accommodate one or multiple (for example, three) cells (also called sectors). When the base station accommodates a plurality of the cells, the entire coverage area of the base station can be divided into a plurality of smaller areas, and each of the smaller areas can provide communication services via a base station subsystem (for example, small type indoor base station RRH: Remote Radio Head).

The term "cell" or "sector" refers to a base station that executes communication service in this coverage and/or a part or the entire of the coverage area of the base station subsystem. Furthermore, the terms "base station", "eNB", "cell", and "sector" can be used interchangeably in the present description. The base station is also referred to as a fixed station, Node B, eNodeB (eNB), an access point, a femto cell, a small cell, and the like.

The UE 100 is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other suitable terms, depending on a person skilled in the art.

The phrase "based on" used in the present description does not mean "based only on" unless specified particularly. It can also be interpreted that the phrase "based on" means both "based only on" and "based at least on".

Furthermore, the terms "including", "comprising", and various forms thereof are intended to be inclusive, similar to "equipped with". Furthermore, the term "or" used in the present description or in the claims does not intend to indicate an exclusive disjunction.

Embodiments of the invention can be expressed as below. According to one aspect of the present invention, a radio communication device (for example, UE 100) that transmits and receives a protocol data unit (PDCP PDU) in a packet data convergence protocol layer located above a radio link control layer, includes a status report generating section (status report generating section 121) that generates a status report (PDCP status report) that indicates reception status of the protocol data unit in the packet data convergence protocol layer; and a status report transmitting section (status report transmitting section 123) that transmits to a destination radio communication device (for example, eNB 200) of the radio communication device in the packet data convergence protocol layer the status report generated by the status report generating section. The status report generating section deletes, when the size of the protocol data unit that includes the status report exceeds a predetermined threshold, an excess part of the status report that exceeds the predetermined threshold. The status report transmitting section transmits to the destination radio communication device the protocol data unit that includes the status report from which the excess part has been deleted.

In the above aspect of the present invention, the status report generating section can determine, based on an instruction from the destination radio communication device, whether to delete the excess part or not.

In the above aspect of the present invention, the status report transmitting section can transmit the protocol data unit that includes an indicator that indicates that the excess part is deleted.

In the above aspect of the present invention, the status report transmitting section can transmit the protocol data unit that includes an indicator that indicates the size of the excess part.

According to another aspect of the present invention, a radio communication device (for example, eNB 200) that transmits and receives a protocol data unit in a packet data convergence protocol layer located above a radio link control layer, includes a status report receiving unit (status report receiving unit 220) that receives from a destination radio communication device (for example, UE 100) of the radio communication device in the packet data convergence protocol layer a status report that indicates reception status of the protocol data unit in the packet data convergence protocol layer; and a retransmission controlling unit (retransmission controlling unit 230) that controls retransmission of the protocol data unit based on the status report received by the status report receiving unit. In the status report, an excess part of the protocol data unit of which the size exceeds a predetermined threshold is deleted. The retransmission controlling unit retransmits the protocol data unit for which the reception status is not included in the status report and that is already transmitted to the destination radio communication device.

According to still another aspect of the present invention, a radio communication method that transmits and receives a protocol data unit in a packet data convergence protocol layer located above a radio link control layer, includes generating includes a radio communication device generating a status report that indicates reception status of the protocol data unit in the packet data convergence protocol layer; and transmitting includes the radio communication device transmitting to a destination radio communication device of the radio communication device in the packet data convergence protocol layer the generated status report. The generating the status report includes deleting, when the size of the protocol data unit that includes the status report exceeds a predetermined threshold, an excess part of the status report that exceeds the predetermined threshold. The transmitting the status report includes transmitting to the destination radio communication device the protocol data unit that includes the status report from which the excess part has been deleted.

According to still another aspect of the present invention, a radio communication device (for example, UE 100) that transmits and receives a protocol data unit (PDCP PDU) in a packet data convergence protocol layer located above a radio link control layer, includes a status report generating section (status report generating section 121) that generates a status report that indicates reception status of the protocol data unit in the packet data convergence protocol layer; and a status report transmitting section (status report transmitting section 123) that transmits to a destination radio communication device (for example, eNB 200) of the radio communication device in the packet data convergence protocol layer the status report generated by the status report generating section. When the size of the protocol data unit that includes the status report exceeds a predetermined threshold, the status report generating section splits the status report and generates status report pieces. The status report transmitting section transmits to the destination radio communication device the protocol data unit that includes the status report pieces.

In the above aspect of the present invention, the status report generating section can determine whether to generate the status report pieces or not based on an instruction from the destination radio communication device.

In the above aspect of the present invention, the status report transmitting section can transmit the protocol data unit that includes an indicator that indicates the number of the status report pieces.

In the above aspect of the present invention, the status report transmitting section can transmit the protocol data unit that includes an indicator that indicates whether any subsequent status report piece exists or not.

In the above aspect of the present invention, the radio communication device can further include U-plane data transmitting unit that transmits the protocol data unit that includes user plane data in an interval when a plurality of the protocol data units that include the status report pieces is transmitted by the status report transmitting section.

According to still another aspect of the present invention, a radio communication method that transmits and receives a protocol data unit in a packet data convergence protocol layer located above a radio link control layer, includes generating includes a radio communication device generating a status report that indicates reception status of the protocol data unit in the packet data convergence protocol layer; and transmitting includes the radio communication device transmitting the generated status report to a destination radio communication device of the radio communication device in the packet data convergence protocol layer. The generating the status report includes, when the size of the protocol data unit that includes the status report exceeds a predetermined threshold, splitting the status report to generate status report pieces. The transmitting the status report includes transmitting to the destination radio communication device the protocol data unit that includes the status report pieces.

According to still another aspect of the present invention, a radio communication device (for example, UE 100) that transmits and receives a protocol data unit in a packet data convergence protocol layer located above a radio link control layer, includes a status report generating section (status report generating section 121) that generates a status report that indicates reception status of the protocol data unit in the packet data convergence protocol layer, and a status report transmitting section (status report transmitting section 123) that transmits the status report generated by the status report generating section to a destination radio communication device (for example, eNB 200) of the radio communication device in the packet data convergence protocol layer. The status report generating section generates a cumulative status report that is the status report constituted by accumulating a sequence number of the protocol data unit for which reception can be confirmed or by accumulating a sequence number of the protocol data unit for which reception cannot be confirmed.

In the above aspect of the present invention, the status report generating section can generate a normal status report having a format that indicates the protocol data unit for which reception can be confirmed and the protocol data unit for which reception cannot be confirmed in a bitmap, and the cumulative status report. The status report transmitting section transmits the cumulative status report when the size of the cumulative status report is smaller than the size of the normal status report.

In the above aspect of the present invention, the status report transmitting section transmits the normal status report when both the size of the cumulative status report and the size of the normal status report are less than a predetermined threshold.

In the above aspect of the present invention, the status report transmitting section transmits, when the size of the cumulative status report constituted by accumulating the sequence number of the protocol data unit for which reception can be confirmed is smaller than the size of the cumulative status report constituted by accumulating the sequence number of the protocol data unit for which reception cannot be confirmed, the cumulative status report constituted by accumulating the sequence number of the protocol data unit for which reception can be confirmed.

In the above aspect of the present invention, the status report transmitting section transmits the protocol data unit that includes an indicator that indicates whether the status report is the cumulative status report constituted by accumulating the sequence number of the protocol data unit for which reception can be confirmed or the cumulative status report constituted by accumulating the sequence number of the protocol data unit for which reception cannot be confirmed.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be easily apparent to a person skilled in the art.

INDUSTRIAL APPLICABILITY

According to embodiments of the radio communication device and the radio communication method described herein, even if the size of the PDCP status report increases, a need for improvement in processing capacity can be avoided while at the same time delay in data transmission in the PDCP layer can be prevented.

EXPLANATION OF REFERENCE NUMERALS

10 mobile communication system
20 radio access network
100 UE
110 DL signal receiving unit
120 PDCP managing unit
121 status report generating section
123 status report transmitting section
130 U-plane data transmitting unit
140 UL signal transmitting unit
200 eNB
210 UL signal receiving unit
220 status report receiving unit
230 retransmission controlling unit
240 PDCP PDU transmitting unit
250 DL signal transmitting unit
300, 311, 313, 321, 323*a* to 323*d*, 331, 333 PDCP PDU
325 indicator

The invention claimed is:

1. A radio communication device that transmits and receives protocol data units in a packet data convergence protocol layer located above a radio link control layer, the radio communication device comprising:
   a receiver that receives, in the packet data convergence protocol layer from a destination radio communication device, a status report indicating reception status of the protocol data units in the packet data convergence protocol layer,
      wherein in the status report, an excess part of a protocol data unit having a size exceeding a maximum size of the protocol data unit is deleted, and
      wherein a sequence number length of the protocol data units in the packet data convergence protocol layer is extended above 15 bits; and
   a processor that controls retransmission of the protocol data units based on the status report such that a protocol data unit that has already been transmitted to the destination radio communication device but for which reception status is not included in the status report is retransmitted.

2. A radio communication device that transmits and receives protocol data units in a packet data convergence protocol layer located above a radio link control layer, the radio communication device comprising:
   a processor that generates a status report indicating reception status of the protocol data units in the packet data convergence protocol layer; and
   a transmitter that transmits the status report in the packet data convergence protocol layer to a destination radio communication device,
      wherein if a size of a protocol data unit that includes the status report exceeds a maximum size of the protocol data unit, the processor splits the status report and generates status report pieces,
wherein a sequence number length of the protocol data units in the packet data convergence protocol layer is extended above 15 bits, and
the transmitter transmits to the destination radio communication device the protocol data units that include the status report pieces.

3. The radio communication device as claimed in claim 2, wherein the processor determines whether to generate the status report pieces based on an instruction from the destination radio communication device.

4. The radio communication device as claimed in claim 2, wherein a protocol data unit transmitted by the transmitter includes an indicator that indicates whether any subsequent status report piece exists.

5. The radio communication device as claimed in claim 2, wherein a protocol data unit transmitted by the transmitter includes user plane data in an interval when a plurality of the protocol data units that include the status report pieces is transmitted.

6. A radio communication method that transmits and receives protocol data units in a packet data convergence protocol layer located above a radio link control layer, the radio communication method comprising:
generating a status report that indicates reception status of the protocol data units in the packet data convergence protocol layer; and
transmitting the status report in the packet data convergence protocol layer to a destination radio communication device, wherein
generating the status report includes, if the size of the protocol data unit that includes the status report exceeds a maximum size of the protocol data unit, splitting the status report to generate status report pieces, and
transmitting the status report includes transmitting to the destination radio communication device the protocol data units that include the status report pieces,
wherein a sequence number length of the protocol data units in the packet data convergence protocol layer is extended above 15 bits.

* * * * *